(12) United States Patent
Sakamoto

(10) Patent No.: US 7,352,393 B2
(45) Date of Patent: Apr. 1, 2008

(54) IMAGE SENSING APPARATUS AND METHOD FOR SYNTHESIZING A COMPOSITE IMAGE

(75) Inventor: Koichi Sakamoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/401,363

(22) Filed: Apr. 11, 2006

(65) Prior Publication Data

US 2006/0187321 A1 Aug. 24, 2006

Related U.S. Application Data

(62) Division of application No. 09/720,345, filed as application No. PCT/JP99/03310 on Jun. 22, 1999, now Pat. No. 7,057,650.

(30) Foreign Application Priority Data

Jun. 22, 1998 (JP) ................................. 10-189638

(51) Int. Cl.
*H04N 5/262* (2006.01)
*H04N 5/225* (2006.01)
*H04N 9/73* (2006.01)

(52) U.S. Cl. ................. 348/239; 348/218.1; 348/223.1

(58) Field of Classification Search ............. 348/218.1, 348/239, 220.1, 584–586; 382/282–284
See application file for complete search history.

(56) References Cited

U.S. PATENT DOCUMENTS

| 5,345,313 | A | | 9/1994 | Blank |
| 5,420,635 | A | | 5/1995 | Konishi et al. |
| 5,907,315 | A | * | 5/1999 | Vlahos et al. ............. 382/167 |
| 6,104,438 | A | | 8/2000 | Saito |
| 6,211,913 | B1 | | 4/2001 | Hansen et al. |
| 6,621,524 | B1 | * | 9/2003 | Iijima et al. ................ 348/584 |
| 6,650,365 | B1 | * | 11/2003 | Sato ........................ 348/231.3 |
| 7,057,650 | B1 | * | 6/2006 | Sakamoto .................... 348/239 |
| 2001/0010546 | A1 | | 8/2001 | Chen |
| 2003/0133019 | A1 | | 7/2003 | Higurashi et al. |
| 2003/0190089 | A1 | | 10/2003 | Katsuda et al. |

FOREIGN PATENT DOCUMENTS

| JP | 57-093788 A | 6/1982 |
| JP | 03-29472 A | 2/1991 |
| JP | 06-324670 A | 11/1994 |
| JP | 10-254049 A | 9/1998 |

* cited by examiner

*Primary Examiner*—Lin Ye
*Assistant Examiner*—Kelly Jerabek
(74) *Attorney, Agent, or Firm*—Birch, Stewart, Kolasch & Birch, LLP

(57) ABSTRACT

A composite image having a natural appearance is obtained when a synthesis target image is combined with a background image. By photographing a subject under different photographic conditions, a plurality of synthesis target images are obtained and the resulting image data is stored beforehand in a synthesis target image memory. A background image is acquired by photography and a suitable synthesis target image to be combined with the background image is selected by a circuit which searches synthesis target images. A color correction is applied to the selected synthesis target image by an image processing circuit and the synthesis target image following the color correction is combined with the background image. Since a synthesis target image suitable for combination with a background image is selected and then is subjected to a color correction and image synthesis processing, a composite image having a natural appearance is obtained.

28 Claims, 25 Drawing Sheets

STROBE PHOTOGRAPHY
SYNTHESIS TARGET IMAGE

FRONTLIT-PHOTOGRAPHY
SYNTHESIS TARGET IMAGE

CLOUDY-WEATHER/BACKLIT-PHOTOGRAPHY
SYNTHESIS TARGET IMAGE

*Fig. 7*  BACKGROUND IMAGE

Fig. 8   COMPOSITE IMAGE

Fig. 14A
RED

| COLOR-BALANCE SETTING VALUE | CORRECTION QUANTITY | |
|---|---|---|
| | Ka | Kb |
| : | : | : |
| : | : | : |
| −3 | −4 | −4 |
| −2 | −3 | −3 |
| −1 | −1 | −1 |
| 0 | 0 | 0 |
| 1 | 2 | 2 |
| 2 | 3 | 3 |
| 3 | 4 | 4 |
| : | : | : |
| : | : | : |
| | | |

Fig. 14B
GREEN

| COLOR-BALANCE SETTING VALUE | CORRECTION QUANTITY | |
|---|---|---|
| | Ka | Kb |
| : | : | : |
| : | : | : |
| −3 | 3 | −3 |
| −2 | 2 | −2 |
| −1 | 1 | −1 |
| 0 | 0 | 0 |
| 1 | −1 | 1 |
| 2 | −2 | 2 |
| 3 | −3 | 3 |
| : | : | : |
| : | : | : |
| | | |

Fig. 14C
BLUE

| COLOR-BALANCE SETTING VALUE | CORRECTION QUANTITY | |
|---|---|---|
| | Ka | Kb |
| : | : | : |
| : | : | : |
| −3 | 0 | 2.5 |
| −2 | 0 | 2 |
| −1 | 0 | 1 |
| 0 | 0 | 0 |
| 1 | 0 | −1.5 |
| 2 | 0 | −3.5 |
| 3 | 0 | −5 |
| : | : | : |
| : | : | : |
| | | |

MANUAL BRIGHTNESS

| BRIGHTNESS SETTING VALUE | CORRECTION QUANTITY $K_{EY}$ |
|---|---|
| ⋮ | ⋮ |
| ⋮ | ⋮ |
| −3 | −9 |
| −2 | −7 |
| −1 | −5 |
| 0 | 0 |
| 1 | 5 |
| 2 | 10 |
| 3 | 13 |
| ⋮ | ⋮ |
| ⋮ | ⋮ |
|  |  |

Fig. 19

| PHOTOGRAPHIC CIRCUMSTANCES | Ks |
|---|---|
| FRONTLIGHTING | 1.0 |
| BACKLIGHTING | 1.0 |
| CLOUDY WEATHER | 0.8 |
| INDOOR | 1.0 |
| OUTDOOR | 0.5 |
| : | |

IMAGE SENSING APPARATUS AND METHOD FOR SYNTHESIZING A COMPOSITE IMAGE

This invention is a Divisional of Application Ser. No. 09/720,345, filed on Dec. 22, 2000, which is the national phase under 35 U.S.C. § 371 of PCT International Application No. PCT/JP99/03310 which has an International filing date of Jun. 22, 1999, and issued as U.S. Pat. No. 7,057,650 on Jun. 6, 2006, the entire contents of which are hereby incorporated by reference and for which priority is claimed under 35 U.S.C. §120.

TECHNICAL FIELD

This invention relates to an image sensing apparatus and method for outputting composite image data representing a composite image.

BACKGROUND ART

A synthesis apparatus for combining an image of scenery and an image of a person obtained by photography has already been realized. In an apparatus of this kind, the person is photographed in advance and the image of the person is extracted from the image obtained. The scenery is photographed separately from the person to obtain the scenery image. The extracted image of the person is combined with the image of the scenery (image data of the portion of the scenery image where the image of the person is to be placed is replaced by the image data representing the image of he person).

The photographic conditions that prevail when the image of the person is obtained (frontlighting or backlighting, indoor or outdoor, strobe photography or not, etc.) often differ from the photographic conditions which prevail when the image of scenery is obtained. If these photographic conditions differ, the composite image may appear unnatural.

DISCLOSURE OF THE INVENTION

An object of the present invention is to obtain a composite image having a natural appearance.

An image sensing apparatus according to a first aspect of the present invention is characterized by having synthesis target image data storage means for storing a plurality of synthesis target images obtained by photography under different photographic conditions; image sensing means for photographing background and outputting data representing a background image; synthesis target image selection means for selecting one item of synthesis target image data suited to a background image from a plurality of items of synthesis target image data, which have been stored in the synthesis target image data storage means, based upon photographic conditions prevailing at time of photography of the background image by the image sensing means; and image synthesis means for combining the synthesis target image selected by the synthesis target image selection means with the background image output from the image sensing means, and outputting composite image data representing a composite image.

The first aspect of the present invention provides also a method suited to the apparatus described above. Specifically, the method is characterized by storing data representing a plurality of synthesis target images obtained by photography under different photographic conditions; photographing background and outputting data representing a background image; selecting one item of synthesis target image data suited to a background image from a stored plurality of items of synthesis target image data based upon photographic conditions prevailing at time of photography of the background image; and combining the selected synthesis target image with background image data and outputting composite image data representing a composite image.

In accordance with the first aspect of the present invention, a subject which includes a synthesis target is photographed a plurality of times under different photographic conditions (photography outdoors with frontlighting, photography outdoors with backlighting, photography indoors, strobe photography indoors, etc.). The synthesis target image is extracted from these plurality of subject images obtained by the photography performed the plurality of times. The data representing the synthesis target image is stored.

Background is photographed and background image data representing the background image is obtained.

On the basis of the photographic conditions that prevailed when the background was photographed (photographic circumstances as to whether the background was photographed with backlighting or frontlighting, color temperature, luminance of the background image, etc.), synthesis target image data representing a synthesis target image the image characteristics whereof are near those of the background image (near in terms of brightness and near in terms of color temperature, i.e., the photographic conditions of which are the same as or almost the same as those of the background image) is selected (automatically or by having the user enter a selection command and then making the selection based upon the entered selection command) from the plural items of synthesis target image data that have been stored.

The synthesis target image represented by the synthesis target image data that has been selected and the background image are combined.

Since a synthesis target image whose image characteristics are near those of the background image is selected and combined with the background image, a composite image having a natural appearance is obtained.

Preferably, photographic conditions at the time of photography of the synthesis target image are stored beforehand and, on the basis of photographic conditions corresponding to the synthesis target image data that has been selected and photographic conditions of the background image, image adjustment processing for at least one of a color adjustment and a luminance adjustment is applied to the synthesis target image represented by the synthesis target image data that has been selected, and the synthesis target image data that has been subjected to the image adjustment processing is combined with the background image data.

The synthesis target image that has been selected is subjected to image adjustment processing for at least one of a color adjustment and a luminance adjustment. As a result, the image characteristics of the synthesis target image that has been subjected to the image adjustment processing will be nearer those of the background image. The composite image obtained therefore appears more natural.

Furthermore, an image adjustment command for at least one of a color adjustment and a luminance adjustment is allowed to be entered and, on the basis of the entered image adjustment command, image adjustment processing for at least one of a color adjustment and a luminance adjustment is applied to the synthesis target image represented by the synthesis target image data that has been selected, and the synthesis target image data that has been subjected to the image adjustment processing is combined with the background image data.

A desired image adjustment (color adjustment, luminance adjustment) can be performed by entering the image adjustment command. This makes it possible to perform image adjustment so as to obtain a composite image preferred by the user.

Preferably, a display unit for displaying images is provided, the background image that has been sensed is displayed on the display unit and so is the composite image.

Preferably, when the composite image is being displayed on the display unit, an adjustment command for at least one of position and size of the synthesis target image being displayed on the display unit is allowed to be entered and an adjustment of at least one of a position and a size adjustment can be applied to the synthesis target image.

The position of the synthesis target image and the size of the synthesis target image data can be adjusted while the synthesis target image being displayed on the display unit is observed. The synthesis target image can be adjusted to the appropriate position and size.

An image sensing apparatus according to a second aspect of the present invention is characterized by having synthesis target information storage means for storing data representing a synthesis target image and photographic conditions prevailing at time of photography of the synthesis target image; image sensing means for photographing background and outputting data representing a background image; image adjustment processing means for applying image adjustment processing for at least one of a color adjustment and a luminance adjustment to the synthesis target image represented by the synthesis target image data, which has been stored in the synthesis target information storage means, based upon the photographic conditions of the synthesis target image that have been stored in the synthesis target information storage means and photographic conditions at time of photography of the background by the image sensing means; and image synthesis means for combining the synthesis target image data that has been subjected to the image adjustment processing by the image adjustment processing means with the background image data output from the image sensing means, and outputting composite image data representing a composite image.

The second aspect of the present invention provides also a method suited to the apparatus described above. Specifically, the method is characterized by storing data representing a synthesis target image and photographic conditions prevailing at time of photography of the synthesis target image; obtaining data representing a background image by photographing background; applying image adjustment processing for at least one of a color adjustment and a luminance adjustment to a synthesis target image represented by synthesis target image data based upon the photographic conditions of the synthesis target image and photographic conditions prevailing at time of photography of the background; and combining the synthesis target image data that has been subjected to the image adjustment processing with the background image data, and outputting composite image data representing a composite image.

In accordance with the second aspect of the present invention, synthesis target image data and photographic conditions of a synthesis target image are stored. In addition, background is photographed and background image data is obtained.

On the basis of the photographic conditions of the synthesis target image and the photographic conditions of the background image, image adjustment processing for at least one of a color adjustment and a luminance adjustment is applied to the synthesis target image represented by the synthesis target image data that has been stored, the synthesis target image data that has been subjected to the image adjustment processing is combined with the background image data and composite image data representing a composite image is output.

Image adjustment processing for at least one of a color adjustment and a luminance adjustment of the synthesis target image is executed based upon the photographic conditions of the synthesis target image and background image. Image characteristics of the synthesis target image that has been subjected to the image adjustment processing are near those of the background image. As a result, the composite image obtained has a natural appearance.

Preferably, synthesis target image data obtained by strobe photography is stored beforehand.

Since a synthesis target image obtained by strobe photography is bright and sharp, image adjustments such as a color adjustment and luminance adjustment are comparatively easy to carry out. A natural composite image is obtained through comparatively simple processing.

An image adjustment command of at least one of a color adjustment and a luminance adjustment may be entered, image adjustment processing for at least one of a color adjustment and a luminance adjustment may be applied to the synthesis target image on the basis of the entered image adjustment command, and the synthesis target image data that has been subjected to the image adjustment processing may be combined with the background image data.

An image adjustment desired by the user is made possible by entering an image adjustment command for carrying out an image adjustment desired by the user. A composite image that satisfies the user can be obtained can thus be obtained.

Further, a display unit for displaying images may be provided, the background image that has been photographed may be displayed on the display unit and so may the composite image.

Preferably, when the background image and composite image are being displayed on the display unit, an adjustment command for at least one of position and size of the synthesis target image being displayed on the display unit is entered and, on the basis of the entered adjustment command, an adjustment of at least one of position and size is applied to the synthesis target image.

The position and size of the synthesis target image can be adjusted while the synthesis target image being displayed on the display unit is observed. The synthesis target image can be adjusted to the appropriate position and size.

BRIEF DESCRIPTION OF THE DRAWINGS

FIGS. 14A to 14C illustrate the relationship between color-balance selection values and amounts of correction;

FIG. 19 illustrates the relationship between photographic circumstances and correction coefficients for color correction;

BEST MODE FOR CARRYING OUT THE INVENTION

First Embodiment (1) Overview of Image Sensing Apparatus

Figure 1:
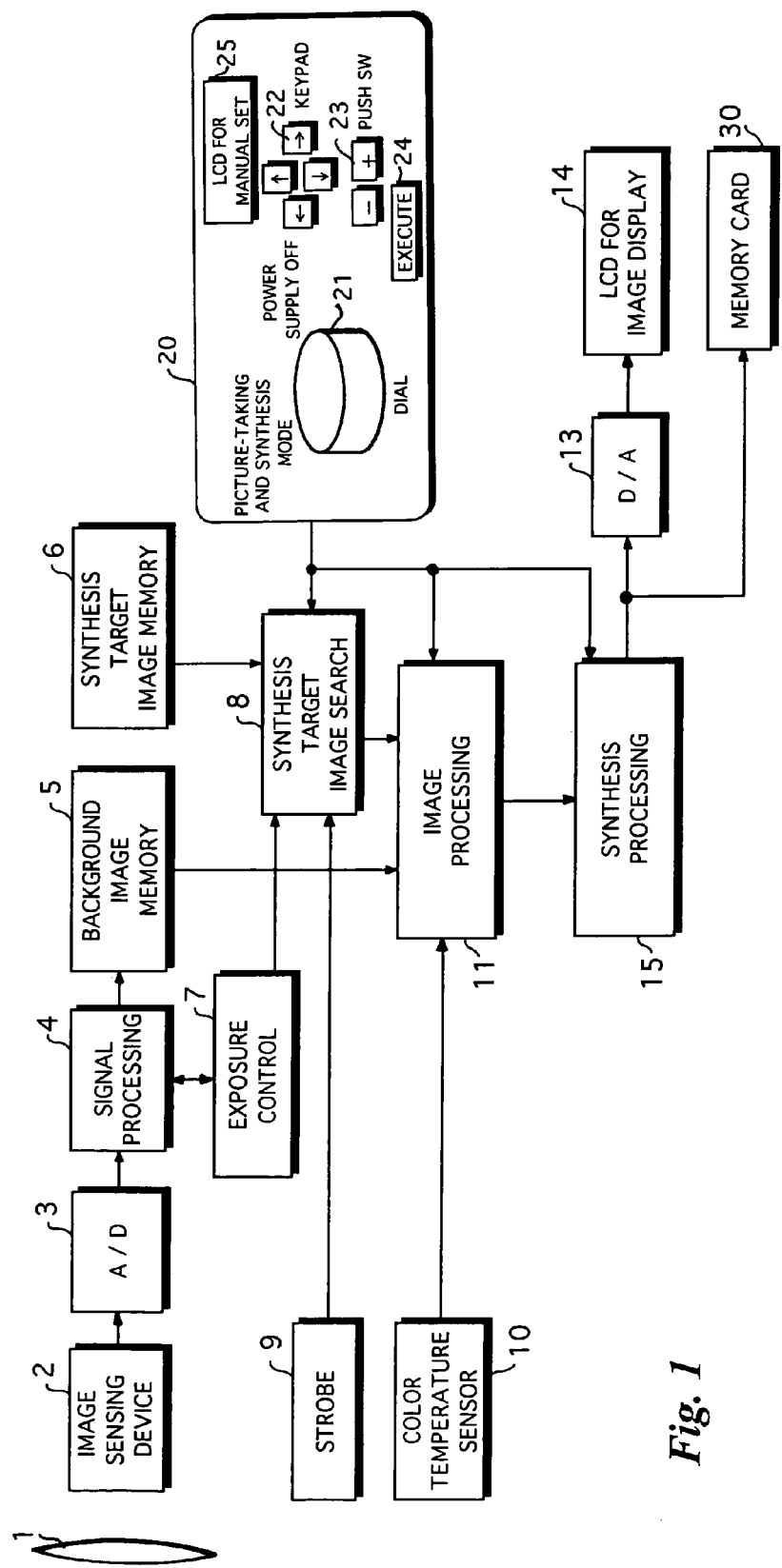
FIG. 1 is a block diagram illustrating the electrical construction of an image sensing apparatus.

FIG. 1 is a block diagram illustrating the electrical construction of an image sensing apparatus.

This image sensing apparatus photographs a subject (e.g., a person) in advance under different photographic conditions, cuts out a specific portion (e.g., a portion corresponding to the person) from each of a plurality of the images obtained by photography and stores synthesis target image data representing each of the plurality of extracted images (referred to as "synthesis target images" below). The apparatus subsequently photographs a subject that will constitute background. The apparatus combines one of the plurality of synthesis target images stored in advance with the background image obtained by photography (replaces image data of the portion of the background image where the synthesis target image is to be placed with image data of the synthesis target image). For example, if the synthesis target image is the image of a person and the background image is the image of scenery, then the apparatus photographs the person in advance under different photographic conditions and stores the results. The apparatus subsequently photographs the scenery, selects the image of the person photographed under photographic conditions that match those of the scenery image obtained by this photography and combines the selected image of the person with the scenery image. The details will become apparent from the description that follows.

The image sensing apparatus includes a synthesis target image memory 6. Synthesis target image data representing a plurality of synthesis target images shot under different photographic conditions has been stored in the synthesis target image memory 6.

The image sensing apparatus includes a key switch group 20. The key switch group 20 includes a dial 21 for turning the power supply of the image sensing apparatus off and for setting a picture-taking mode, a picture-taking and synthesis mode, a synthesis mode, a synthesis target image selection mode and other modes (the power supply being turned on by setting the picture-taking mode, picture-taking and synthesis mode, synthesis mode, synthesis target image selection mode or other mode); an arrow key pad 22 for designating a position to which a synthesis target image displayed on an image-display liquid crystal display unit 14 is to be moved; a push switch 23 which includes minus and plus buttons for designating a reduction ratio and enlargement ratio of a synthesis target image displayed on the image-display liquid crystal display unit 14; an execute button 24 for applying various execution commands such as a command to start synthesis processing; and a manual-setting liquid crystal display unit 25 which presents various displays for manually setting color balance, brightness and contrast. Signals output from these switches and the like are input to a synthesis target image search circuit 8, an image processing circuit 11 and a synthesis processing circuit 15.

The picture-taking mode is a mode in which a subject (a person, scenery, or other subject) is photographed without performing image synthesis. The picture-taking and synthesis mode is a mode in which a subject that will serve as a background image is photographed and a synthesis target image is combined with the background image obtained by photography. The synthesis mode is a mode in which a synthesis target image is combined with a background image represented by background image data that has been stored in a background image memory 5.

The light image of the background is formed on the photoreceptor surface of an image sensing device 2 through an imaging lens 1. A video signal representing the background image is output from the image sensing device 2 and is converted to RGB digital image data in an analog/digital conversion circuit 3. The digital image data output from the analog/digital conversion circuit 3 enters a signal processing circuit 4.

The image sensing apparatus includes an exposure control circuit 7. Image data output from the analog/digital conversion circuit 3 is applied to the exposure control circuit 7. On the basis of the input data, the exposure control circuit 7 performs exposure control such as an f-stop number adjustment and shutter-speed adjustment for photography. Exposure control can also be carried out based upon an output signal from a metering device (sensor). On the basis of the entered image data, the exposure control circuit 7 calculates the average luminance of the background image and the spot luminance at the center of the background image. The exposure control circuit 7 further determines whether photography is backlit or frontlit photography based upon the luminance difference between average luminance and spot luminance.

The signal processing circuit 4 subjects image data to a gamma correction. Image data output from the signal processing circuit 4 is input to the background image memory 5, where the data is stored temporarily.

The image sensing apparatus includes also the synthesis target image search circuit 8. The latter is a circuit which searches synthesis target images acquired under different photographic conditions for a synthesis target image that suits the captured background image.

The image sensing apparatus includes also a strobe unit 9. Data representing the fact that the strobe has been fired or whether or not the strobe has been fired is input to the synthesis target image search circuit 8 from the strobe unit 9.

Synthesis target image data suited to the background image found by the synthesis target image search circuit 8 is read out of the synthesis target image memory 6 and input to the image processing circuit 11. Data representing the background image that has been stored temporarily in the background image memory 5 also is input to the image processing circuit 11.

The image sensing apparatus further includes a color temperature sensor 10. Color temperature information (data) output from the color temperature sensor 10 is input to the image processing circuit 11. The latter executes a first color correction, described later, based upon the entered color temperature information.

Background image data obtained by photography is input to a digital/analog conversion circuit 13 via the image processing circuit 11 and synthesis processing circuit 15. The digital/analog conversion circuit 13 converts the background image data to an analog video signal. The analog video signal obtained by the conversion is applied to the image-display liquid crystal display unit 14 so that the background image is displayed.

In image synthesis processing, synthesis target image data is applied to the synthesis processing circuit 15 via the image processing circuit 11. The synthesis processing circuit 15 executes superposition synthesis in such a manner that the synthesis target image is superimposed on the background image. Data representing the image obtained by superposition synthesis is supplied from the synthesis processing circuit 15 to the image-display liquid crystal display unit 14 via the digital/analog conversion circuit 13. The synthesis target image superimposed on the background image is displayed on the image-display liquid crystal display unit 14.

If a move command is applied to the synthesis processing circuit 15 from the arrow key pad 22, the synthesis processing circuit 15 applies move processing (a position-data offset, etc.) to the synthesis target image data in such a manner that the synthesis target image, which is being superimposed on the background image, will move (this represents adjustment of the position of the synthesis target image). Further, if an enlarge or reduce command is applied to the synthesis processing circuit 15 from the push switch 23, the synthesis processing circuit 15 executes processing (pixel interpolation, etc.) to enlarge or processing (pixel downsampling, etc.) to reduce the synthesis target image being superimposed on the background image (this represents adjustment of the size of the synthesis target image).

If the execute button 24 is pressed by the user when a synthesis target image is being superimposed on the background image, the portion at which the synthesis target image is located is cut from the background image. The synthesis target image is fit into the portion that has been cut away (this represents image synthesis). Composite image data representing this composite image is displayed on the image-display LCD 14 via the digital/analog conversion circuit 13 and is applied also to a memory card 30.

Figure 2:
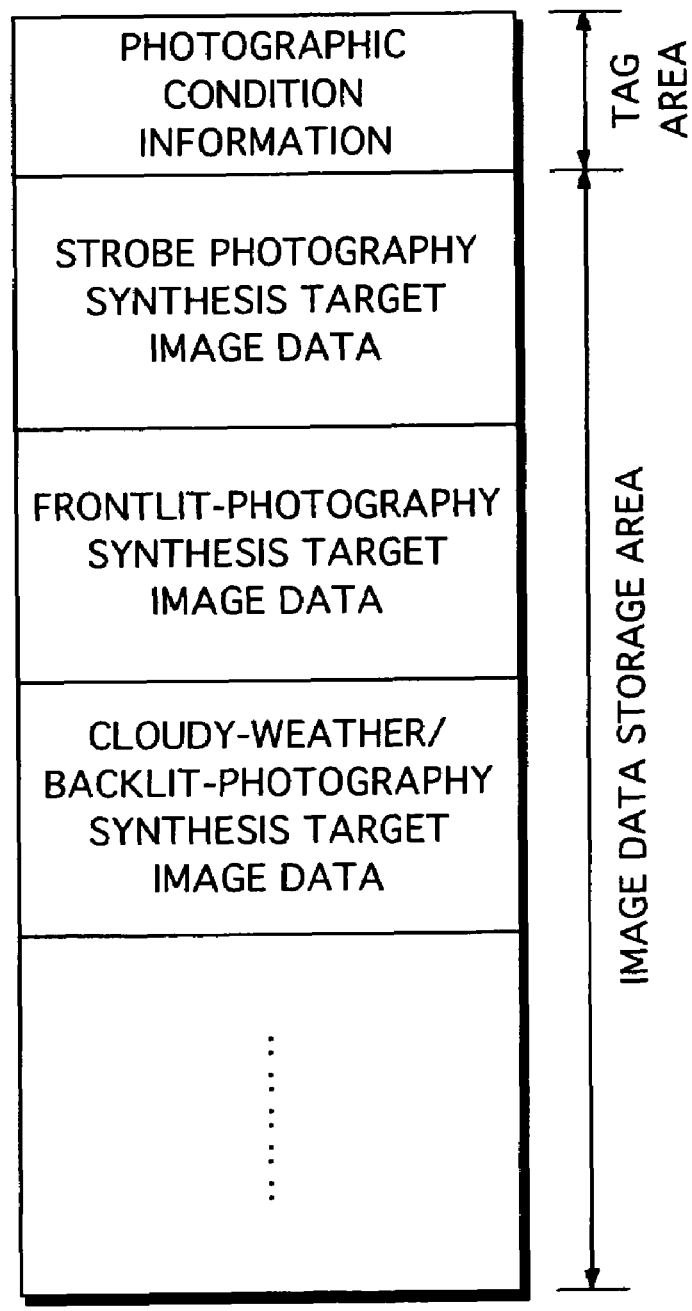
FIG. 2 illustrates the structure of a memory file of a synthesis target image.

FIG. 2 illustrates a file (a synthesis target image memory file) that has been stored in the synthesis target image memory 6.

The synthesis target image memory file includes a tag area and an image data storage area.

Synthesis target image data representing a plurality of synthesis target images obtained by photography under different photographic conditions has been stored in the image data storage area. More specifically, strobe-photography synthesis target image data obtained by photographing a subject using a strobe flash, frontlit-photography synthesis target image data obtained by photographing a subject with frontlighting, and cloudy-weather/backlit-photography synthesis target image data obtained by photographing a subject in cloudy weather has been stored.

Figure 3:
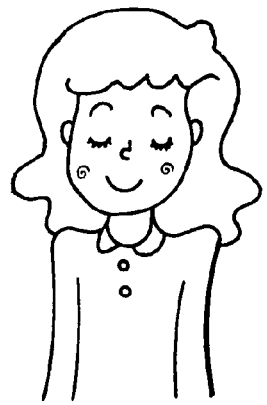
FIG. 3 illustrates an example of a synthesis target image under strobe photography.
Figure 4:
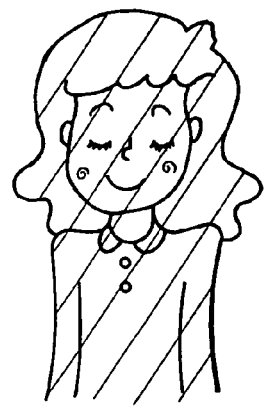
FIG. 4 illustrates an example of a synthesis target image under front-lit photography.
Figure 5:
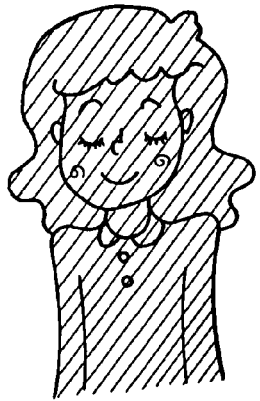
FIG. 5 illustrates an example of a synthesis target image under back-lit photography in cloudy weather.

A strobe-photography synthesis target image represented by the strobe-photography synthesis target image data is illustrated in FIG. 3, a frontlit-photography synthesis target image represented by the frontlit-photography synthesis target image data is illustrated in FIG. 4, and a cloudy-weather/backlit-photography synthesis target image represented by the cloudy-weather/backlit-photography synthesis target image data is illustrated in FIG. 5.

In this example, photography in cloudy weather and photography with backlighting are taken as being photography under identical photographic conditions. However, photography in cloudy weather and photography with backlighting may be treated as photography under separate photographic conditions, and image data representing images obtained under separate photographic conditions may be stored separately in the synthesis target image memory file.

Photographic condition information of each item of image data that has been stored in the image data storage area is stored in the tag area in a form linked to the corresponding item of image data (or together with linking information). The photographic condition information is information representing photographic circumstances, namely whether image data is image data that has been obtained by photography with frontlighting or image data that has been obtained by cloudy-weather (or backlit) photography [information representing whether a photographic condition among photographic conditions is frontlighting or cloudy weather (backlighting) shall be referred to as "photographic circumstances information"]; information representing image data is image data that has been obtained by strobe photography; information representing color temperature at the time of photography; and information representing average luminance at the time of photography.

These items of photographic condition information are obtained at photography of a synthesis target image represented by image data that has been stored in the image data storage area. For example, photographic condition information indicative of frontlit photography or cloudy-weather photography can be obtained based upon the difference between a spot metering value and an average metering value prevailing at photography of the subject. Photographic condition information indicating whether photography is strobe photography or not can be obtained based upon whether or not the strobe flashed at the time the subject was photographed. Photographic condition information representing color temperature can be obtained based upon the output of a color temperature sensor in a camera at the time the subject is photographed. Photographic condition information representing average luminance can be obtained based upon a metering value (obtained from image data, which is input to the exposure control circuit 7, or from a metering element) prevailing at the time the subject is photographed.

A synthesis target image also may be produced by manipulating image data (cutting out a specific portion thereof, such as a person) obtained by this image sensing apparatus.

Figure 6:
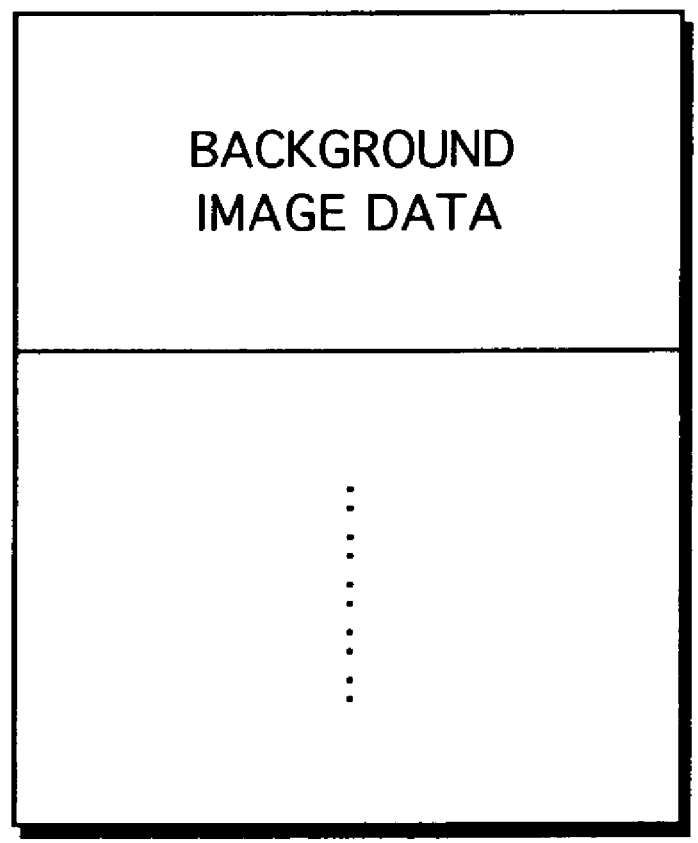
FIG. 6 illustrates the structure of a memory file of a background image.

FIG. 6 illustrates a file (a background image memory file) that has been stored in the background image memory 5.

Background image data obtained by photography is stored in a background image memory file. In this embodiment, the background image memory file does not contain a tag area, unlike the synthesis target image memory file. Of course, the background image memory file also may be provided with a tag area in a manner similar to the synthesis target image memory file and photographic condition information prevailing at the time the background image is photographed may be stored there. In such case luminance information obtained from the exposure control circuit 7, strobe flash information from the strobe flash circuit 9 and color temperature information output from the color temperature sensor 10 would also be applied to the background image memory 5 and stored there.

Figure 7:
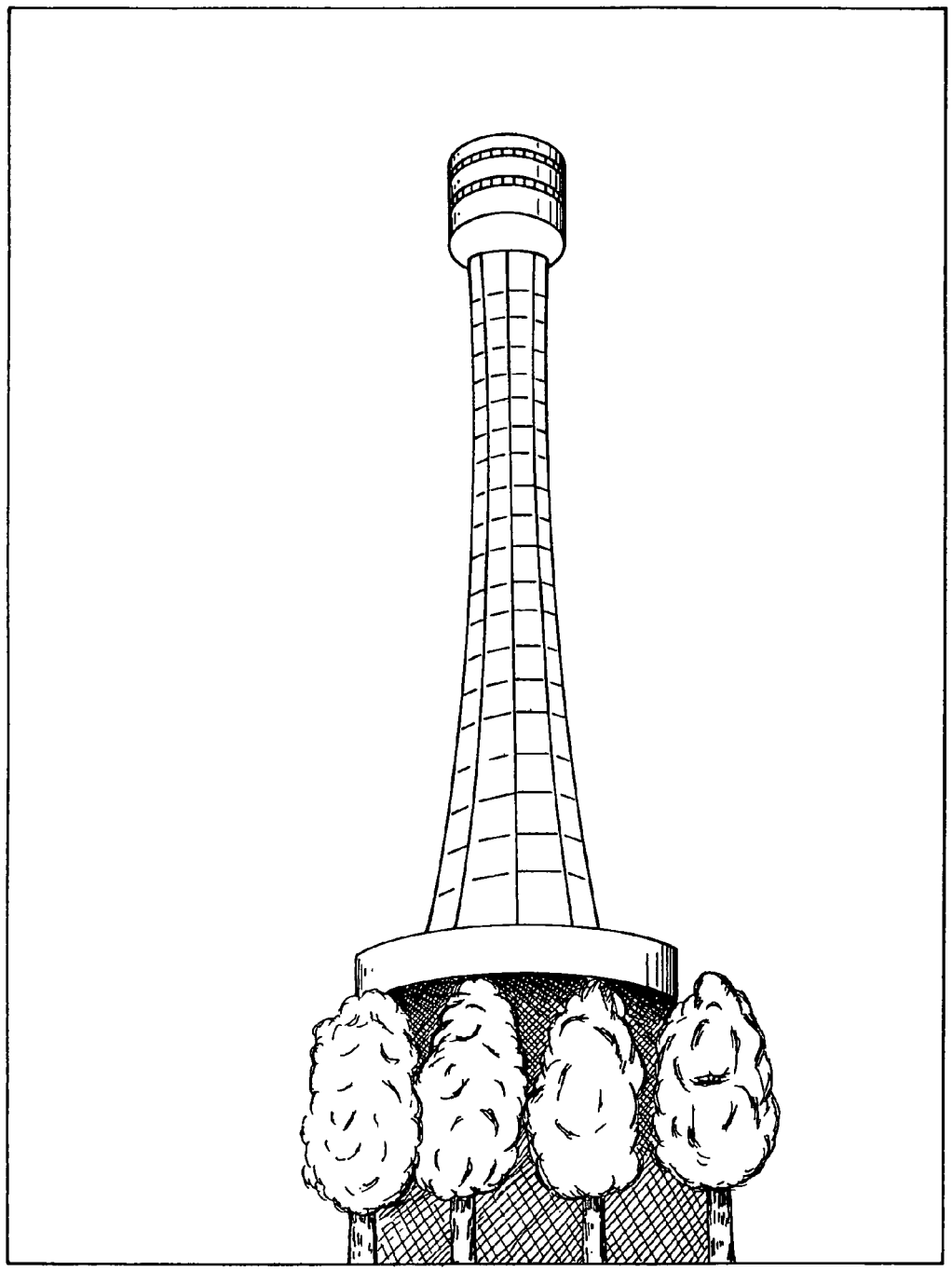
FIG. 7 illustrates an example of a background image.

FIG. 7 illustrates an example of a background image represented by background image data obtained by photography and stored temporarily in the background image memory 5. This background image is displayed on the image-display liquid crystal display unit 14 before image synthesis processing is executed.

Figure 8:
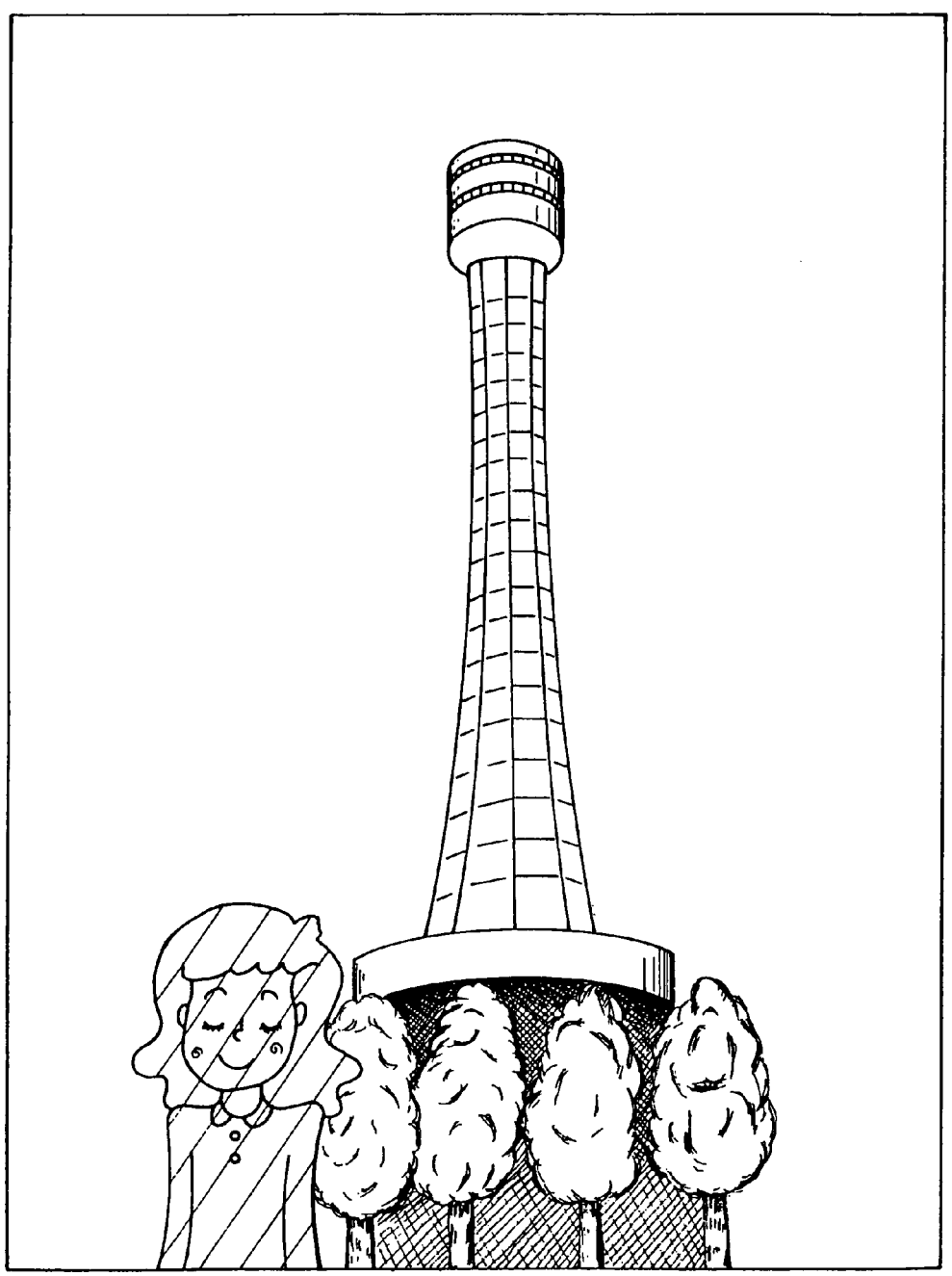
FIG. 8 illustrates an example of a composite image.
Figure 9:
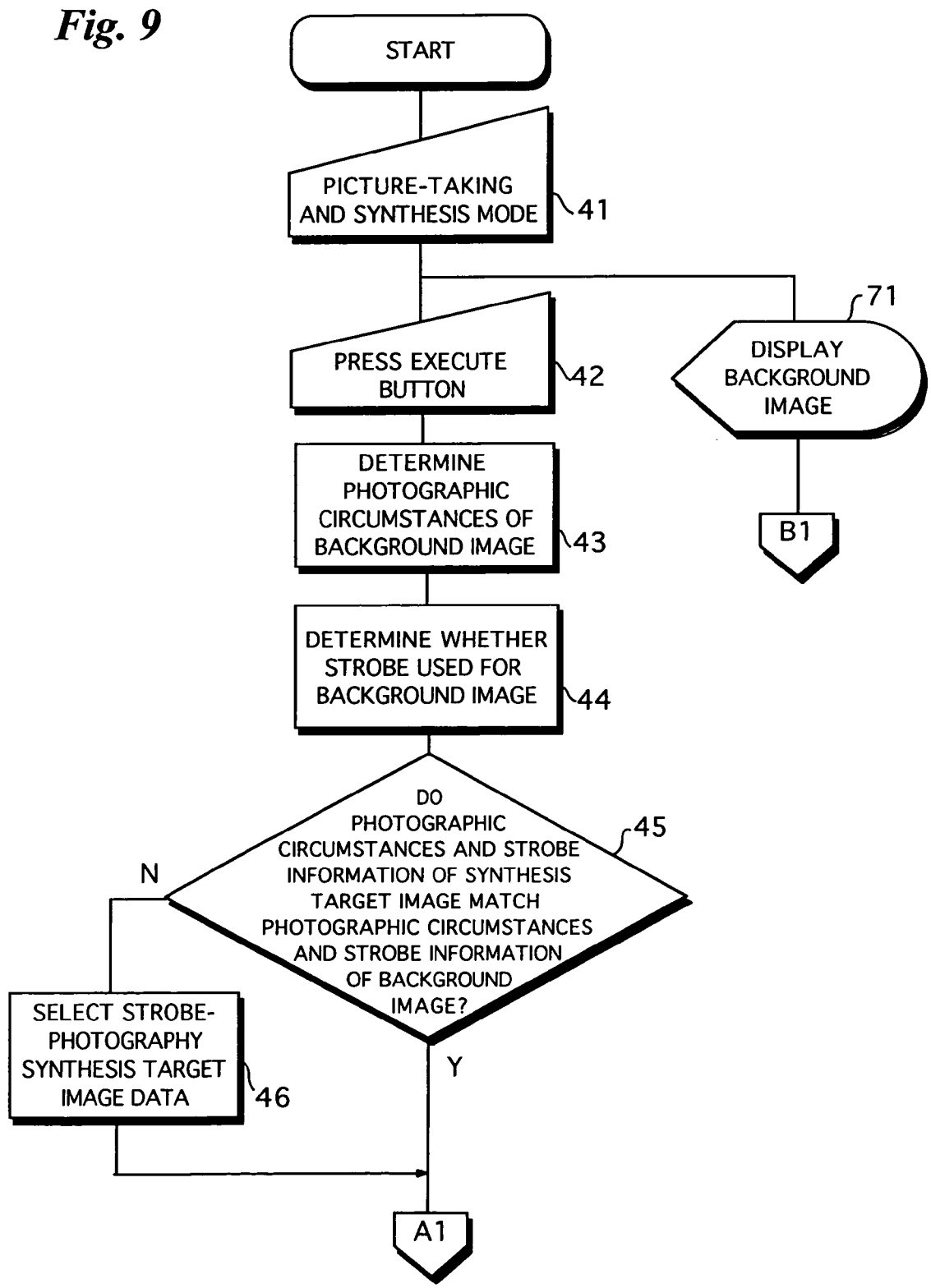
FIG. 9 is a flowchart illustrating the procedure of image synthesis processing.
Figure 10:
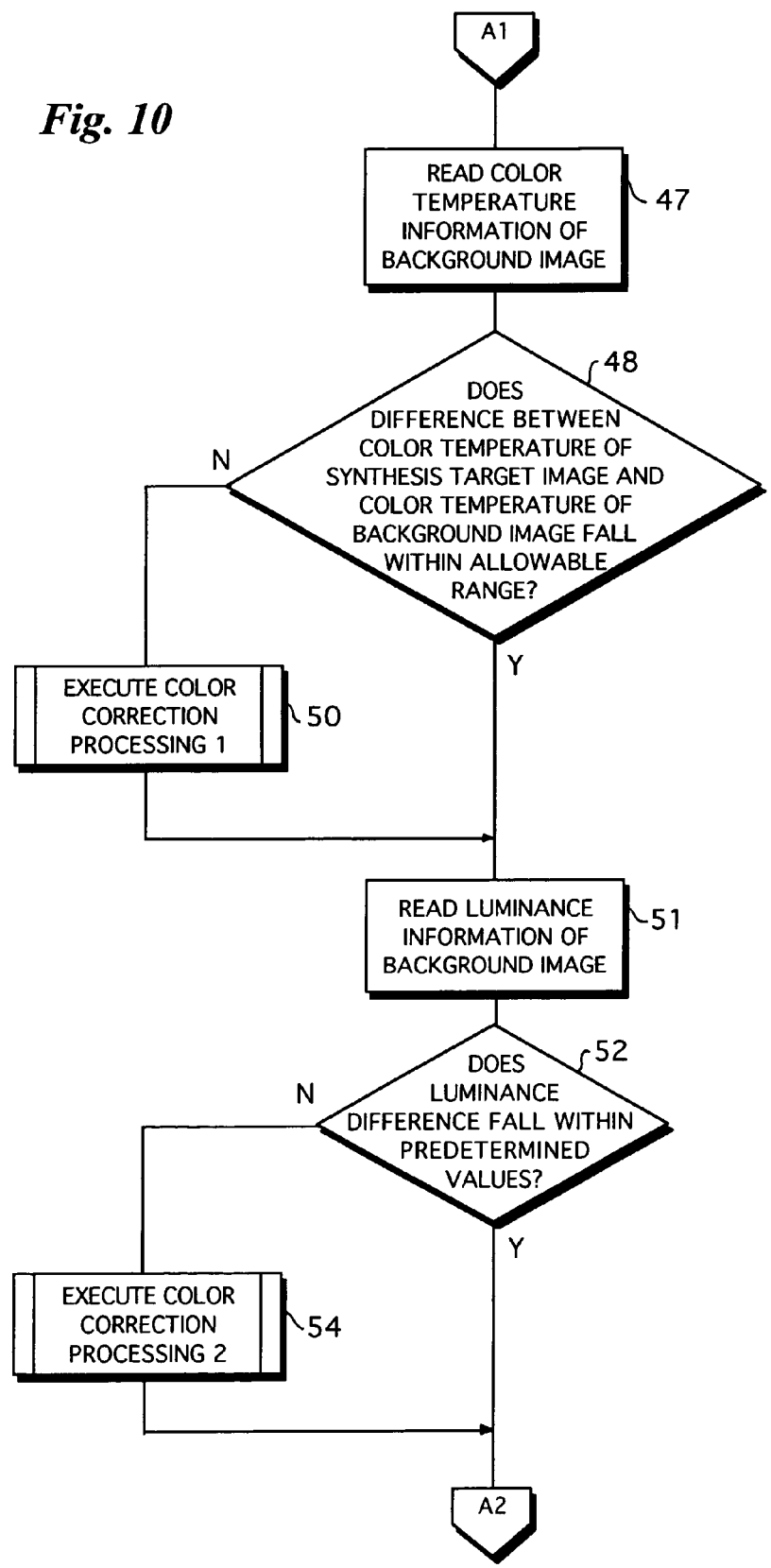
FIG. 10 is a flowchart illustrating the procedure of image synthesis processing.
Figure 11:
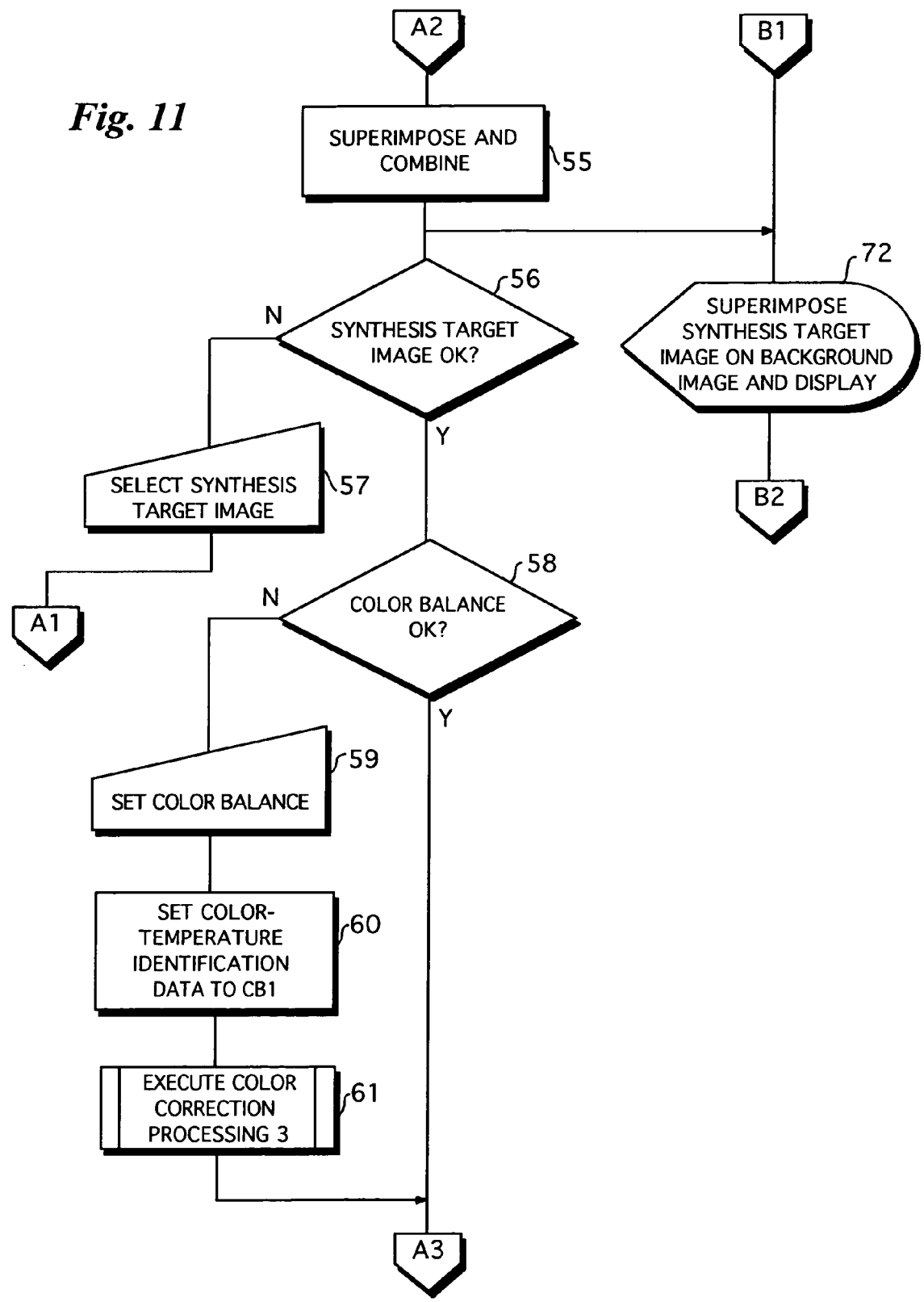
FIG. 11 is a flowchart illustrating the procedure of image synthesis processing.

FIG. 8 illustrates an example of a composite image obtained by combining a synthesis target image (the image of a girl at the lower left) with the background image. A composite image of this kind is displayed on the image-display liquid crystal display unit 14. The composite image is one obtained after the position and size of the synthesis target image have been adjusted, in the manner described earlier, while observing the composite image resulting from superposition.

(2) Image Synthesis Processing

FIGS. 9 to 12 are flowcharts illustrating the procedure of image synthesis processing by the image sensing apparatus according to the first embodiment.

Before image synthesis is performed in the picture-taking and synthesis mode, strobe-photography synthesis target image data obtained by strobe photography, frontlit-photography synthesis target image data obtained by photography with frontlighting, and cloudy-weather/backlit-photography synthesis target image data obtained by photography in cloudy weather is stored in the synthesis target image memory 6, as described above.

If the dial 21 is turned to establish the picture-taking and synthesis mode, the background image being formed on the image sensing device 2 is displayed on the image-display liquid crystal display unit 14 at all times (as a moving picture) (step 71). If the composition of the background image has been decided, the user presses a shutter-release button (not shown). The background is photographed and background image data representing the background image obtained by photography is stored temporarily in the background image memory 5. The background image data representing the background image is read out of the background image memory 5 and is applied to the image-display liquid crystal display unit 14 via the image processing circuit 11, synthesis processing circuit 12 and digital/analog conversion circuit 13, whereupon the background image is displayed on the image-display liquid crystal display unit 14 as a still picture.

If the execute button 24 is pressed (step 42), a transition is made to image synthesis processing. It is determined whether the background image was obtained by frontlit photography or backlit photography (step 43). This determination is made by the exposure control circuit 7 based upon a difference between the luminance level of a predetermined area at the center of the background image and the average luminance level of the background image. Next, it is determined whether the background image was shot using a strobe flash (step 44). This determination is made based upon strobe information output from the strobe unit 9.

Next, one item of synthesis target image data is found by the synthesis target image search circuit 8 from the synthesis target image data representing a plurality of synthesis target images that have been stored in the synthesis target image memory 6. This search processing is as follows: Photographic condition information is read out of the tag area of the synthesis target image file that has been stored in the synthesis target image memory 6. Synthesis target image data for which the frontlighting/backlighting photographic circumstances and strobe information contained in the photographic condition information that has been read out matches those of the background image is read out of the synthesis target image memory 6 ("YES" at step 45).

If synthesis target image data possessing a tag area which matches the result of the determination regarding the frontlighting/backlighting photographic circumstances of the background image and the result of the determination regarding the strobe has not been stored in the synthesis target image memory 6 ("NO" at step 45), then strobe-photography synthesis target image data is selected from the image data that has been stored in the synthesis target image memory 6 (step 46). The strobe-photography synthesis target image data that has been selected is read out of the synthesis target image memory 6.

Furthermore, the background-image color temperature sensed by the color temperature sensor 10 is read out of a memory (not shown) in the image processing circuit 11 (step 47). It is determined whether the difference between the color temperature of the synthesis target image read out of the synthesis target image memory 6 and the color temperature of the background image just read out falls within an allowable range (step 48).

If the difference is not within the allowable range ("NO" at step 48), then first color correction processing regarding the synthesis target image is executed (step 50). First color correction processing will be described later.

If the difference between the color temperature of the synthesis target image read out of the synthesis target image memory 6 and the read color temperature of the background image falls within the allowable range ("YES" at step 48), then the processing of step 50 is skipped.

Next, luminance information concerning the background image is read out (step 51). The luminance information is obtained based upon the background image data applied to the exposure control circuit 7. It is determined whether the luminance difference between the average luminance of the synthesis target image read out of the synthesis target image memory 6 and the read average luminance of the background image falls within predetermined values (step 52).

The details are as follows:

First, the image data of each pixel of RGB in the background image is converted to a luminance value Ey of each pixel in accordance with Equation 1.

$$Ey = 0.2125R + 0.7154G + 0.0721B \quad \text{Eq. 1}$$

Average luminance data is calculated from the luminance data of each pixel obtained by the conversion. Letting AEy1 (which has been stored in the tag area of the synthesis target image memory file) represent the average luminance regarding the synthesis target image and letting AEy2 represent the average luminance regarding the background image, we calculate an absolute value AEy3 of the average luminance difference of each image in accordance with Equation 2.

$$AEy3 = |AEy1 - AEy2| \quad \text{Eq. 2}$$

It is determined whether the absolute value AEy3 of the average luminance difference calculated in accordance with Equation 2 is equal to or less than a predetermined value (P, where P preferably is eight levels among 256 levels of 0 to 255) (if Equation 3 is satisfied, then it is judged that the difference falls within predetermined values).

$$AEy3 \; P \quad \text{Eq. 3}$$

If the luminance difference does not fall within the predetermined values ("NO" at step 52), second color correction processing concerning the synthesis target image is executed (step 54). The details of second color correction will be described later.

The synthesis processing circuit 15 executes synthesis processing for superimposing the background image data and synthesis target image data (adds the data of the two images) (step 55). The data obtained by superposition is applied to the image-display liquid crystal display unit 14 via the digital/analog conversion circuit 13. The synthesis target image is displayed superimposed on the background image on the image-display liquid crystal display unit 14 (step 72).

In a case where it is desired to combine a synthesis target image different from the synthesis target image being displayed on the display screen of the image-display liquid crystal display unit 14, the use selects another synthesis target image ("NO" at step 56; step 57). The dial 21 is turned to establish the synthesis target image selection mode. By pressing the push switch 23, synthesis target images represented by synthesis target image data that has been stored in the synthesis target image memory 6 are displayed on the image-display liquid crystal display unit 14 in order one frame at a time. When the desired synthesis target image is displayed, the user presses the execute button 24 to thereby select the synthesis target image. In a case where a new synthesis target image has been selected, processing from step 47 onward is repeated.

The user observes the synthesis target image being displayed on the display screen of the image-display liquid crystal display unit 14 and, upon deciding that this synthesis target image should be combined with the background image, presses the execute button 24 ("YES" at step 56).

Next, the user observes the synthesis target image (which has been superimposed on the background image) being displayed on the display screen of the image-display liquid crystal display unit 14 and determines whether the color balance of the synthesis target image is acceptable (step 58). If the color balance is acceptable, the user presses the execute button 24.

Figure 13:
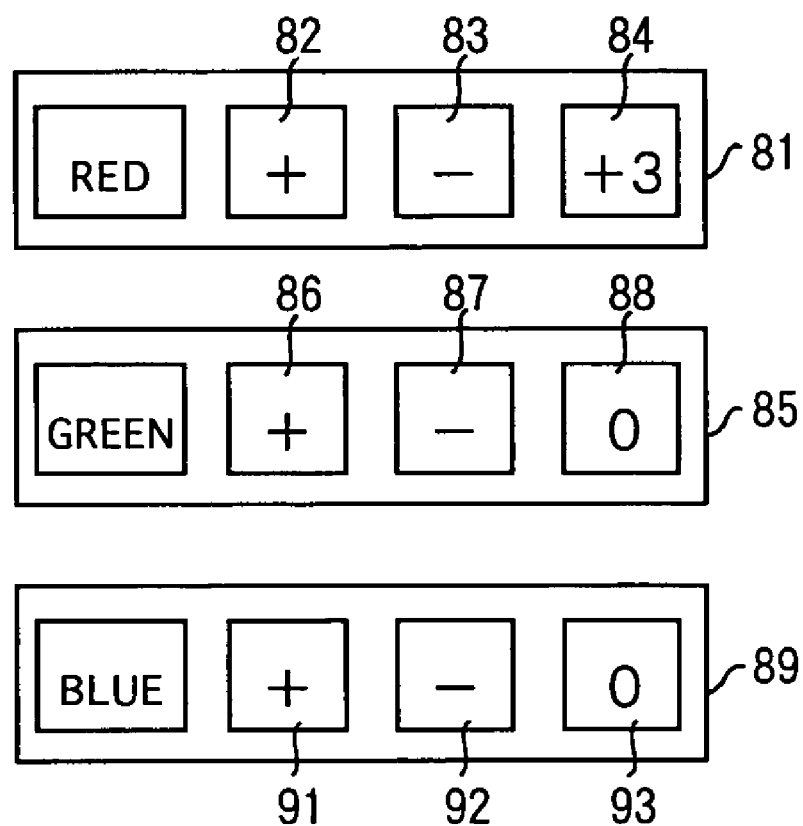
FIG. 13 illustrates an example of a screen for manual setting of color balance.

FIG. 13 illustrates an example of a screen for manual setting of color balance displayed on the manual-setting liquid crystal display unit 25. An arrangement may be adopted in which the manual color-balance setting screen is displayed in response to a command provided by the user.

The manual color-balance setting screen includes an area 81 set by the user when the color red is adjusted, an area 85 set by the user when the color green is adjusted, and an area 89 set by the user when the color blue is adjusted.

The red-color area 81 includes an area 82 touched by the user when the amount of red component is to be increased, an area 83 touched by the user when the amount of red component is to be decreased, and a setting display area 84 for displaying how far the set red component is from a reference amount (the amount of red component when no color balance adjustment has been applied). The green-color area 85 includes an area 86 touched by the user when the amount of green component is to be increased, an area 87 touched by the user when the amount of green component is to be decreased, and a setting display area 88 for displaying how far the set green component is from a reference amount (the amount of green component when no color balance adjustment has been applied). The blue-color area 89 includes an area 91 touched by the user when the amount of blue component is to be increased, an area 92 touched by the user when the amount of blue component is to be decreased, and a setting display area 93 for displaying how far the set blue component is from a reference amount (the amount of blue component when no color balance adjustment has been applied).

The user sets the color balance using the areas 81 to 93.

FIGS. 14A, 14B, 14C illustrate the relationship between color-balance setting values (which correspond to the setting values being displayed in the setting display areas 84, 88 and 93) and the correction values. The color balance correction is carried out based upon these relationships. As will be described later, Ka represents a correction quantity regarding color data a* in an L*a*b* calorimetric system, and Kb represents a correction quantity regarding color data B* in the L*a*b* colorimetric system.

If color balance is set by the user (step 59), color-temperature identification data used in third color correction processing, described later, is set to CB1 (step 60). (Color-correction identification data takes on a value of CB0 or CB1. The data is set to CB0 when the power supply is turned from off to on.) Thereafter, third color correction processing regarding the synthesis target image is executed (step 61). The details of third color correction processing will be described later.

If it is unnecessary to adjust the color balance of the synthesis target image being displayed on the image-display liquid crystal display unit 14 ("YES" at step 58), the user presses the execute button 24 and processing skips from step 59 to step 61.

Next, by observing the synthesis target image (which has been superimposed on the background screen) being displayed on the image-display liquid crystal display unit 14, the user checks the brightness of the synthesis target image (step 62). If the brightness is acceptable ("YES" at step 62), the user presses the execute button 24.

Figures 15, 16:
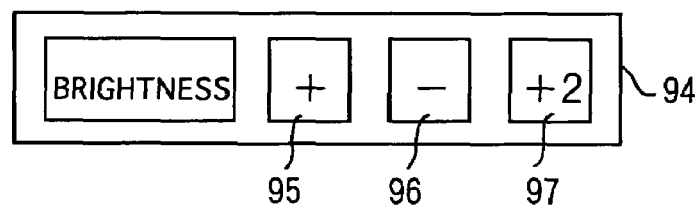
FIG. 15 illustrates an example of a screen for manual setting of brightness.
FIG. 16 illustrates the relationship between brightness selection values and amounts of correction.

In a case where the brightness of the synthesis target image being displayed is unacceptable and the user adjusts the brightness ("NO" at step 62), a manual setting area 94 shown in FIG. 15 being displayed on the manual-setting liquid crystal display unit 25 is utilized. An arrangement may be adopted in which the manual setting area 94 also is displayed in response to a display command provided by the user.

The manual setting area 94 includes an area 95 touched by the user when the brightness of the synthesis target image is to be increased; an area 96 touched by the user when the brightness of the synthesis target image is to be decreased; and a setting display area 97 for displaying how far the brightness is from a brightness reference amount (which indicates brightness when no which indicates brightness adjustment has been applied).

If brightness is set manually by the user, luminance identification data used in second color correction processing, described later, is set to LM1 (step 64). (Luminance identification data takes on a value of LM0 or LM1. The data is set to LM0 when the power supply is turned from off to on.) On the basis of the set brightness (the value being displayed in the setting display area 97 corresponds to a brightness setting value in FIG. 16), a correction quantity KEY shown in FIG. 16 is calculated and brightness of the synthesis target image is corrected by second color correction processing (step 65, this second color correction processing being processing identical with that of step 54).

Next, the position of the synthesis target image (superimposed on the background image) being displayed on the image-display liquid crystal display unit 14 is adjusted by manipulating the arrow key pad 22. Further, the size of the synthesis target image is adjusted by pressing the push switch 23 (step 66). If the position and size of the synthesis target image have been decided, the user presses the execute button 24 so that the synthesis target image is combined with the background image (step 68). (The synthesis processing circuit 15 cuts the portion of the synthesis target image from the background image and fits the synthesis target image data into the cut-out portion to generate composite image data.) The result is displayed on the image-display liquid crystal display unit 14.

The composite image data representing the composite image obtained by synthesis processing is stored on the memory card 30 (step 69).

Figure 17:
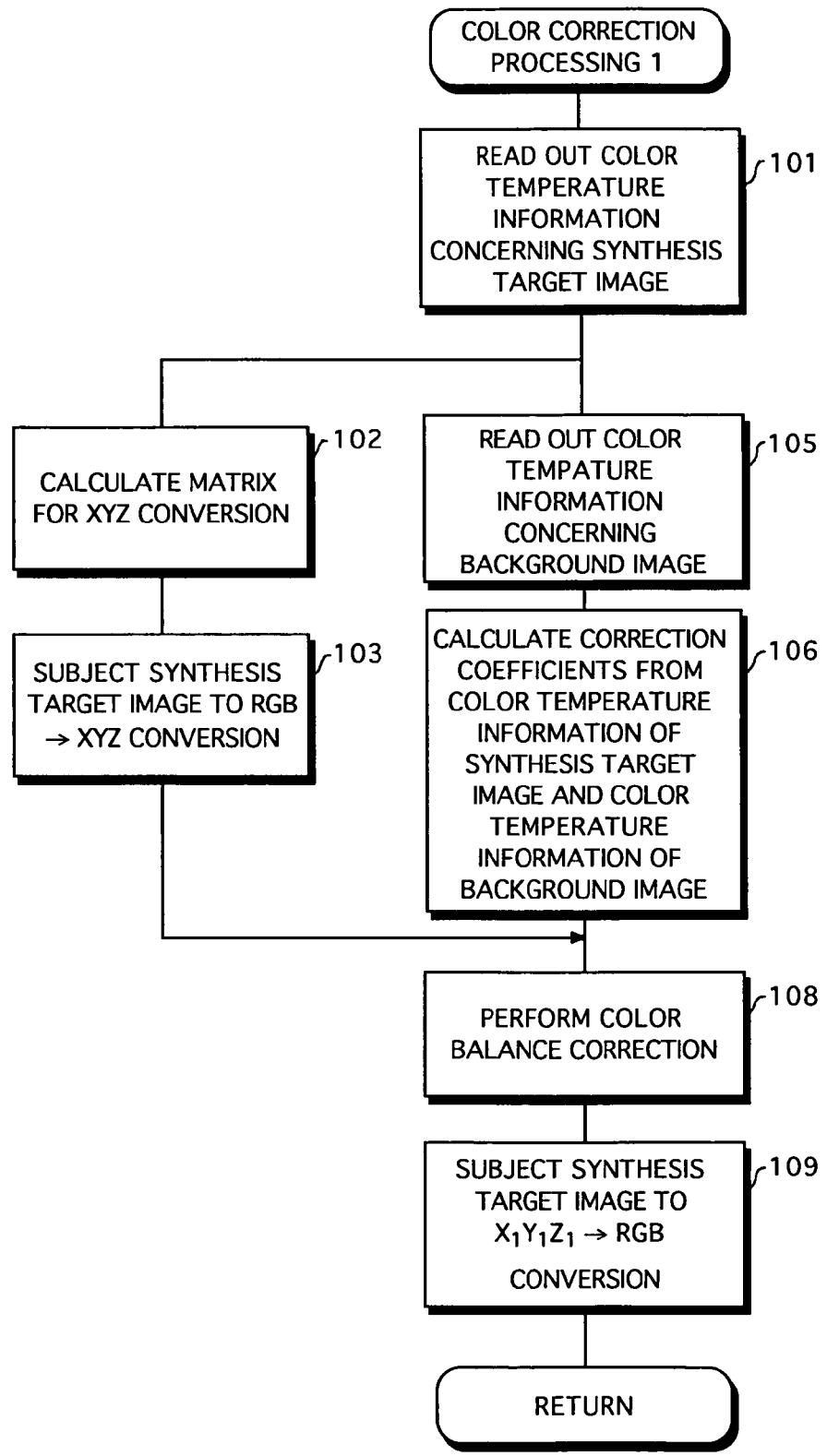
FIG. 17 is a flowchart illustrating the procedure of first color correction processing.

FIG. 17 is a flowchart illustrating the procedure of first color correction processing. The first color correction processing subjects the synthesis target image to a color (white) balance correction.

In first color correction processing, color temperature information of the synthesis target image is first read out of the tag area of the synthesis target image memory file (step 101).

The image data representing the synthesis target image is 8-bit image data for each of R, G, B. This 8-bit image data R, G, B is converted to image data of tristimulus values XYZ (steps 102, 103). The image data of the tristimulus values XYZ obtained by the conversion undergoes a color balance correction.

More specifically, the 8-bit image data R, G, B is converted temporarily to non-linear RGB data $R_0$, $G_0$, $B_0$. The non-linear RGB data $R_0$, $G_0$, $B_0$ is further converted to linear RGB data $R_1$, $G_1$, $B_1$. Finally, the linear RGB data $R_1$, $G_1$, $B_1$ is converted to tristimulus values XYZ.

In general, relations defined by Equations 4 hold between the 8-bit image data R, G, B and non-linear RGB data $R_0$, $G_0$, $B_0$. The 8-bit image data R, G, B is converted to the non-linear RGB data $R_0$, $G_0$, $B_0$ in accordance with Equations 4.

$R_0 = R/255$ $G_0 = G/255$ $B_0 = B/255$                                               Eq. 4

If consideration is given to a characteristic (decided by a function f), which is specific to the image sensing apparatus, between the non-linear RGB data $R_0$, $G_0$, $B_0$ and linear RGB data $R_1$, $G_1$, $B_1$, a relation indicated by Equation 5 is established, where $V_0 = R_0$, $G_0$, $B_0$, $V = R_1$, $G_1$, $B_1$ hold.

$$V_0 = f(V)$$                                              Eq. 5

The non-linear RGB data $R_0$, $G_0$, $B_0$ is converted to the linear RGB data $R_1$, $G_1$, $B_1$ using Equation 5. For example, if the γ characteristic of the image sensing apparatus is in compliance with ITU-RBT.709 (INTERNATIONAL TELECOMMUNICATION UNION ITU Radio-communication BT Series 709), then Equation 5 can be expressed by Equation 6. The non-linear RGB data $R_0$, $G_0$, $B_0$ is converted to the linear RGB data $R_1$, $G_1$, $B_1$ using the relation of Equation 6.

$$V_0 = \begin{cases} 1.099 \times V0.45 - 0.099 & 0.018 V 1.0 \\ 4.50 \times V & 0.0 V < 0.018 \end{cases}$$                                              Eq. 6

The conversion from the linear RGB data $R_1$, $G_1$, $B_1$ to the tristimulus values XYZ is performed in accordance with Equation 7.

$$\begin{bmatrix} X/100 \\ Y/100 \\ Z/100 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_1 \\ G_1 \\ B_1 \end{bmatrix}$$                                              Eq. 7

The matrix of $a_{11}$~$a_{33}$ used in Equation 7 is calculated based upon the characteristics of a color filter in the image sensing device 2 and the color temperature of the subject (step 102). The linear RGB data $R_1$, $G_1$, $B_1$ is converted to the tristimulus values XYZ in accordance with Equation 7 using the matrix calculated (step 103). The 8-bit image data R, G, B is thus converted to the tristimulus values by the foregoing processing.

The color temperature of the background image is read out of the memory in image processing circuit 11 (step 105).

Correction coefficients used in correction of color balance are calculated from the color temperature of the synthesis target image and the color temperature of the background image (step 106). The processing for calculating the correction coefficients is carried out in the manner described below.

In general, color temperature T and x [x=X/(X+Y+Z), X, Y, Z are tristimulus values) are related as indicated by Equations 8.

$$x = -4.6070 \times 10^9 / T^3 + 2.9678 \times 10^6 / T^2 +$$                                              Eq. 8

$$0.09911 \times 10^3 / T + 0.244063$$

$$(4000K \ T \ 7000K)$$

$$x = -2.0064 \times 10^9 / T^3 + 1.9081 \times 10^6 / T^2 +$$

$$0.24748 \times 10^3 / T + 0.237040$$

$$(7000K \ T \ 25000K)$$

Further, y [y=Y/(X+Y+Z), X, Y, Z are tristimulus values) and x are related as indication by Equation 9.

$$y = -3.000x^2 + 2.870x - 0.275$$                                              Eq. 9

The values of x and y are calculated from Equations 8 and 9. The calculated x and y are substituted into the above-cited relations x=X/(X+Y+Z), y=Y/(X+Y+Z). If Y=100.0 (=$Y_n$) holds, then X and Y are calculated. The X, Y, Z thus obtained are white points $X_n$, $Y_n$, $Z_n$.

White points $X_{n1}$, $Y_{n1}$, $Z_{n1}$ of the synthesis target image at the time of photography are calculated using the color temperature of the synthesis target image, and white points $X_{n2}$, $Y_{n2}$, $Z_{n2}$ of the background image at the time of photography of the background image are calculated using the color temperature of the background image.

Correction coefficients $X_{n2}/X_{n1}$, $Y_{n2}/Y_{n1}$, $Z_{n2}/Z_{n1}$ are calculated using the calculated white points $X_{n1}$, $Y_{n1}$, $Z_{n1}$, $X_{n2}$, $Y_{n2}$, $Z_{n2}$ In accordance with Equation 10, the calculated correction coefficients are multiplied by the tristimulus values X, Y, Z of the synthesis target image to thereby carry out the color balance correction [where $X_1$, $Y_1$, $Z_1$ are tristimulus values after the color balance correction (i.e., data representing the synthesis target image after the color balance correction)] (step 108).

$$X_1 = X_{n2}/X_{n1} \times X$$

$$Y_1 = Y_{n2}/Y_{n1} \times Y$$

$$Z_1 = Z_{n2}/Z_{n1} \times Z \qquad \text{Eq. 10}$$

Of course, a Von Kries color adaptation prediction equation may be used instead of Equation 10.

The tristimulus values ($X_1, Y_1, Z_1$) that have undergone the color balance correction are converted to RGB data (step 109).

Figure 18:
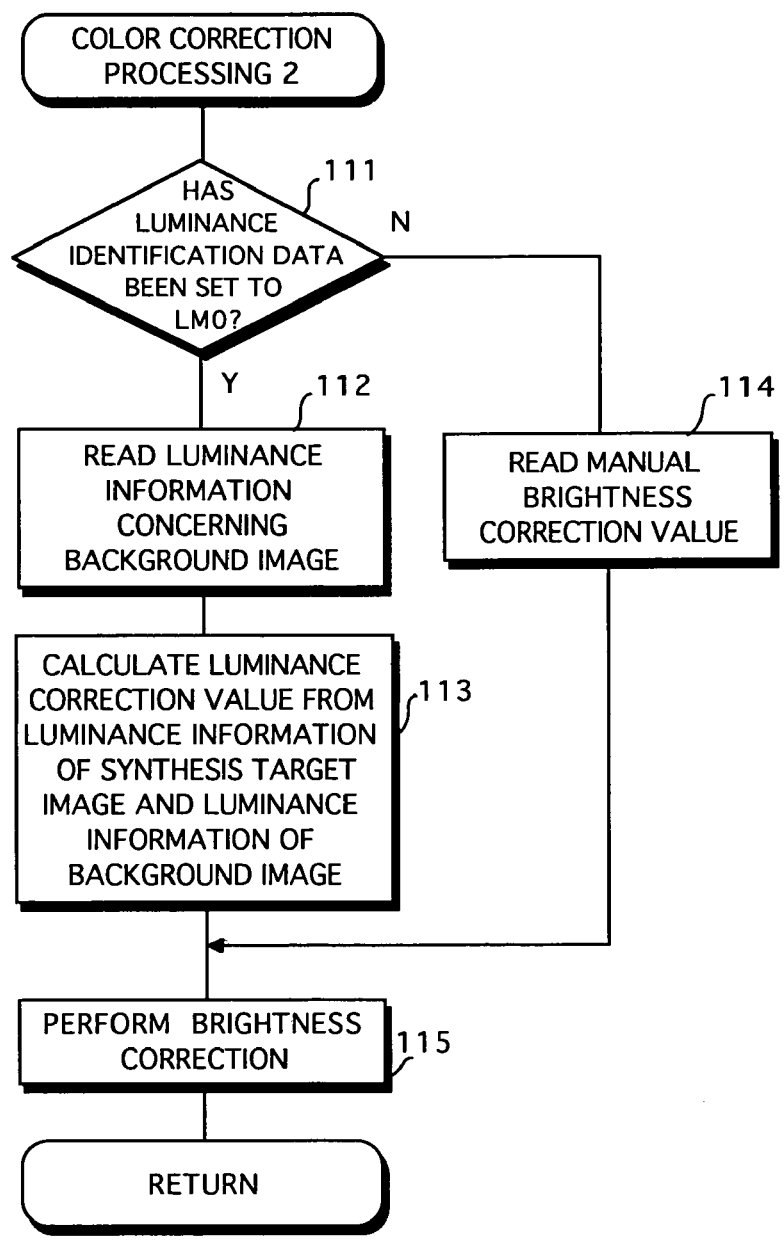
FIG. 18 is a flowchart illustrating the procedure of second color correction processing.

FIG. 18 is a flowchart illustrating the procedure of second color correction processing, and FIG. 19 illustrates the relationship between photographic circumstances such as frontlighting and backlighting and correction values.

The second color correction processing subjects the synthesis target image to a brightness correction.

The brightness correction in second color correction processing includes an automatic brightness correction (step 54 in FIG. 10) performed in a case where the luminance difference between average luminance of the synthesis target image and average luminance of the background image does not fall within predetermined values, and a manual brightness correction (step 65 in FIG. 12) in which brightness correction values are set manually by the user.

In second color correction processing, first it is determined whether the luminance identification data has been set to LM0 or not in order to judge whether the automatic brightness correction or the manual brightness correction is to be carried out (step 111).

If the luminance identification data has been set to LM0 ("YES" at step 111), then, in order to perform the automatic brightness correction, luminance information concerning the background image is read (step 112) in a manner similar to that of the reading of the luminance information of the background image described above (step 51 in FIG. 10).

Next, a luminance correction value is calculated from the luminance information of the synthesis target image and the luminance information of the background image (step 113). More specifically, from the relationship shown in FIG. 19, first a luminance correction coefficient KS is decided based upon the photographic circumstances as to whether the background image is frontlit or backlit (whether the image was captured indoors or at night is determined based upon the color temperature). As indicated by Equation 11, the luminance correction value $K_{EY}$ is calculated by multiplying the determined luminance correction coefficient Ks by the luminance difference between calculated average luminance AEy1 of the synthesis target image and average luminance AEy2 of the background image.

$$K_{EY} = Ks(AEy1 - AEy2) \qquad \text{Eq. 11}$$

A brightness correction is performed next (step 115).

If the correction is the automatic brightness correction, the calculated brightness correction value KEY is added to each item of the RGB synthesis target image data R, G, B, as indicated by Equations 12. As a result, synthesis target image data having brightness-corrected $R_2$ data, $G_2$ data and $B_2$ data is obtained.

$$R_2 = R + K_{EY}$$

$$G_2 = R + K_{EY}$$

$$G_2 = R + K_{EY} \qquad \text{Eq. 12}$$

Figure 12:
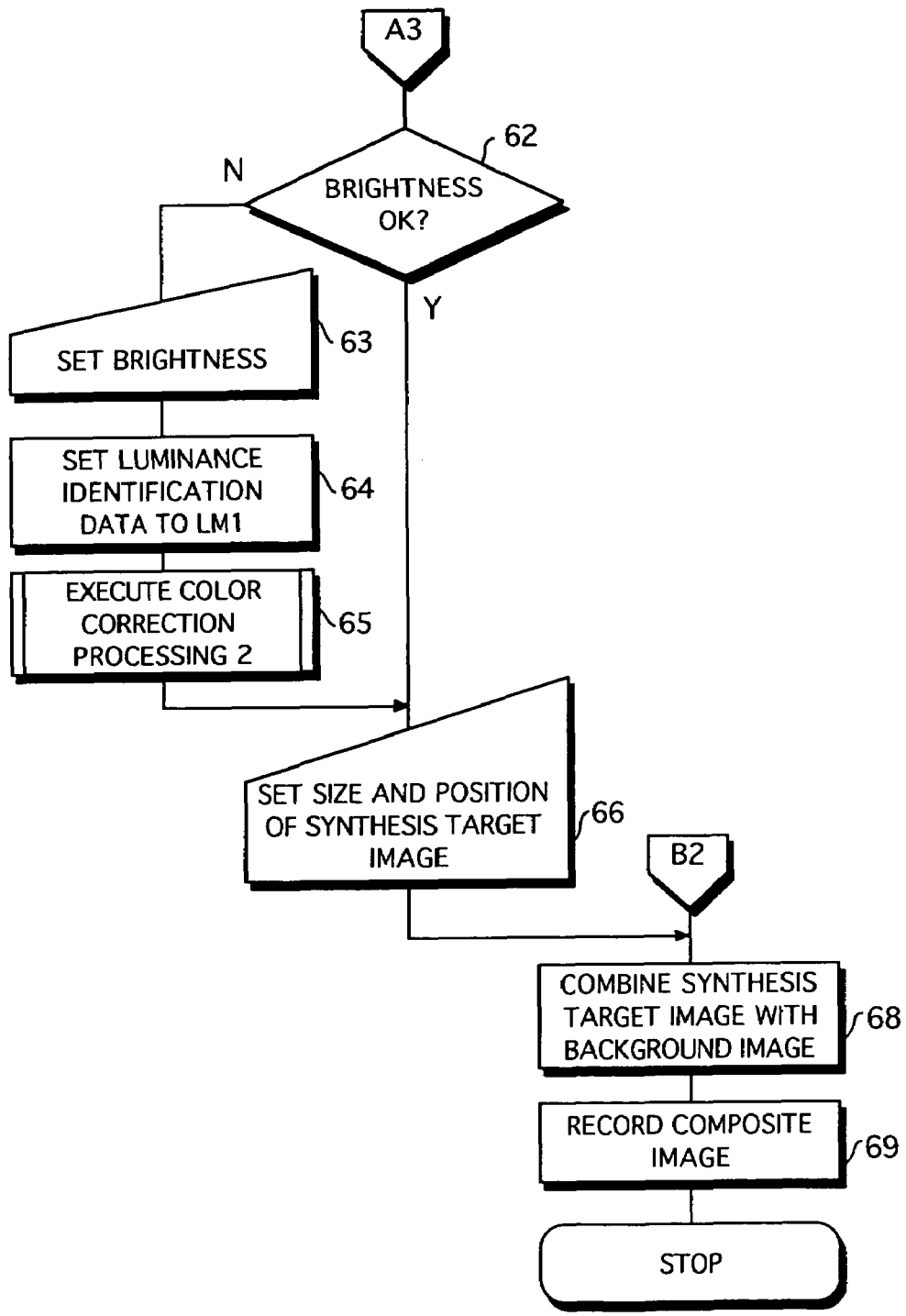
FIG. 12 is a flowchart illustrating the procedure of image synthesis processing.

If the luminance identification data has not been set to LM0 ("NO" at step 111), it is judged that the correction is the automatic brightness correction and the brightness correction value $K_{EY}$ (see FIG. 16) that was set at step 63 in FIG. 12 is read (step 114). The brightness correction is carried out by adding the read brightness correction value $K_{EY}$ to the RGB synthesis target image data.

In FIG. 19, the correction coefficient Ks for backlighting differs from that for cloudy weather. However, an average value of the correction coefficient for backlighting and the correction coefficient for cloudy weather may be used as a common correction coefficient for both backlighting and cloudy weather.

Figure 20:
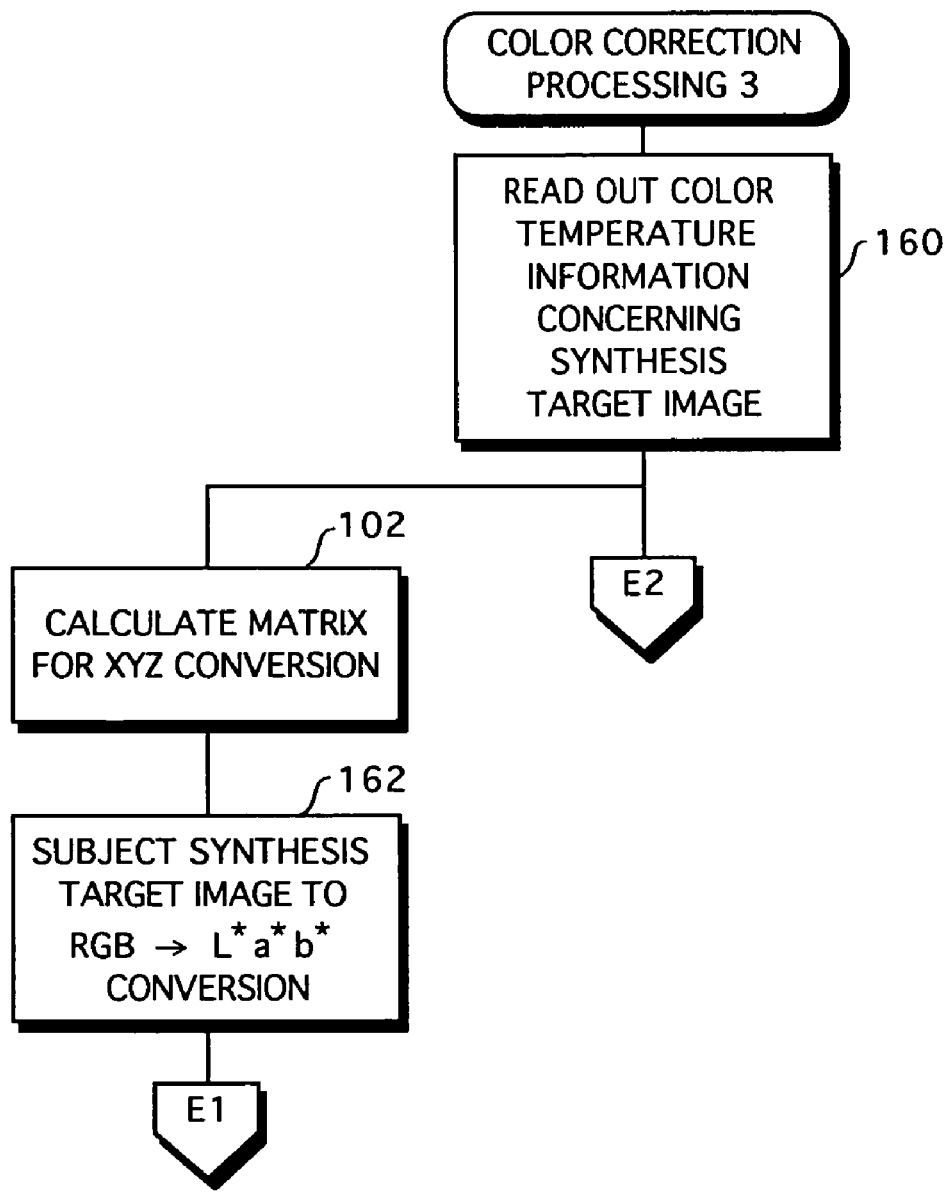
FIG. 20 is a flowchart illustrating the procedure of third color correction processing.
Figure 21:
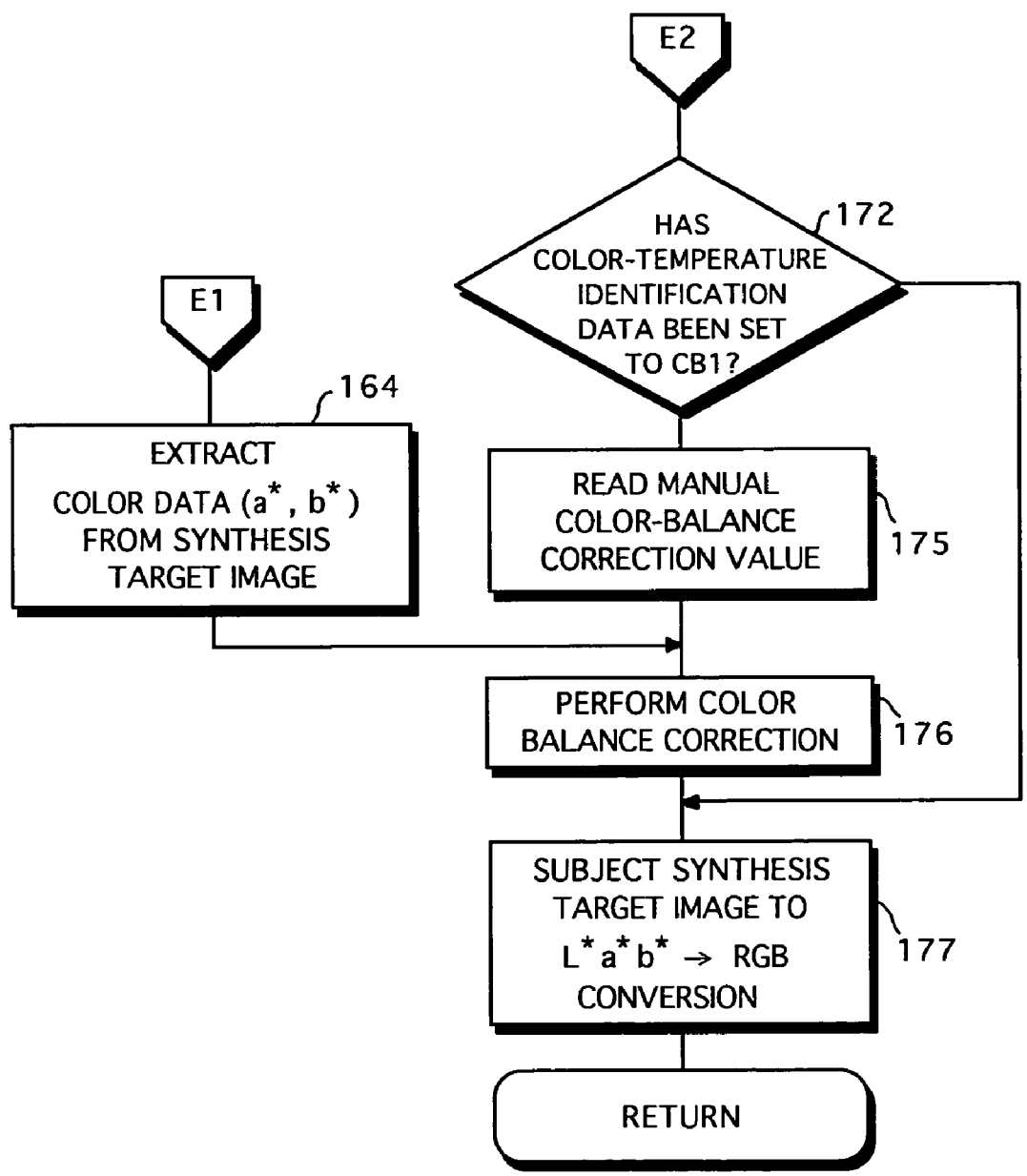
FIG. 21 is a flowchart illustrating the procedure of third color correction processing.
Figure 22:
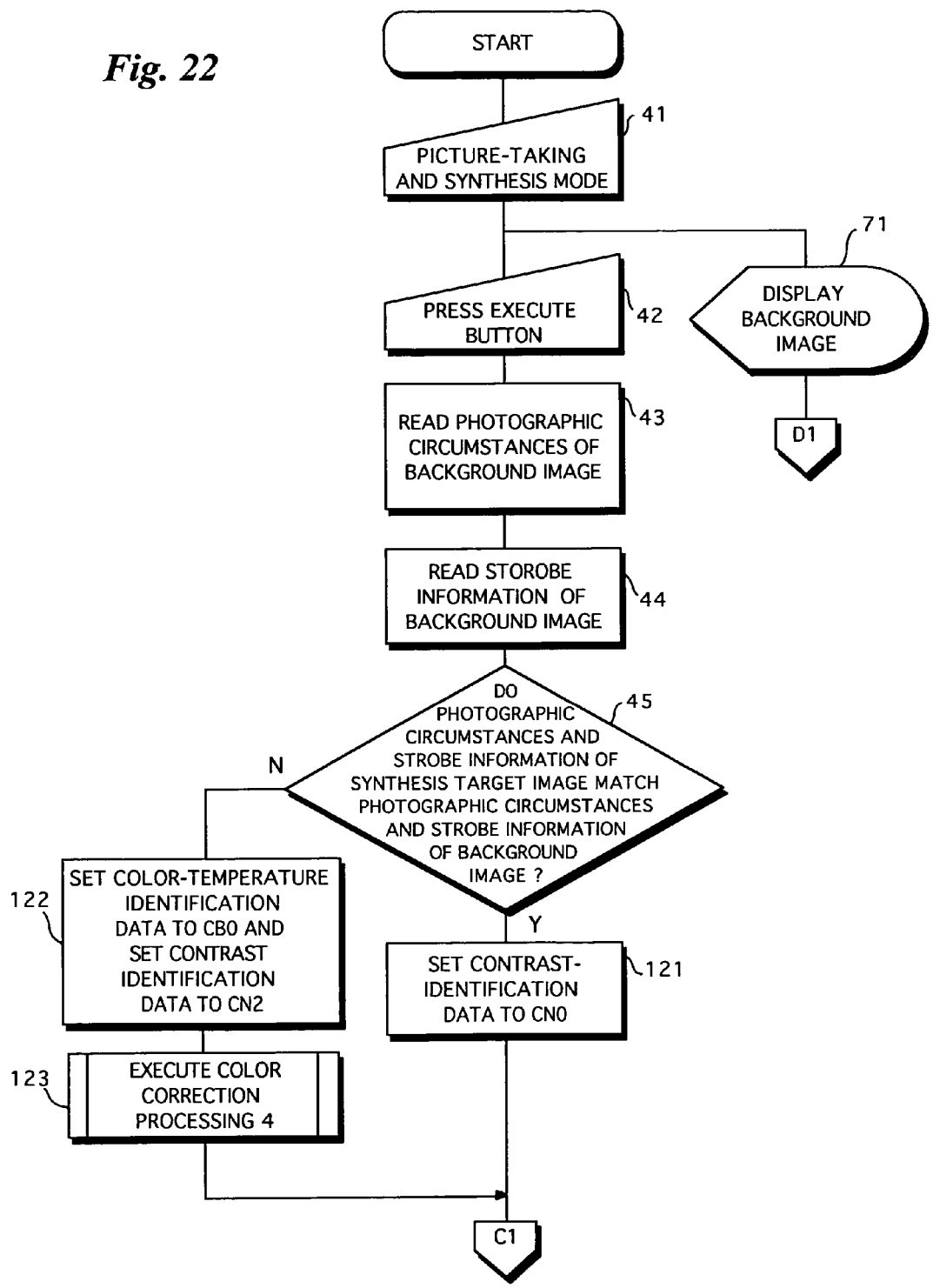
FIG. 22 is a flowchart illustrating the procedure of image synthesis processing.
Figure 23:
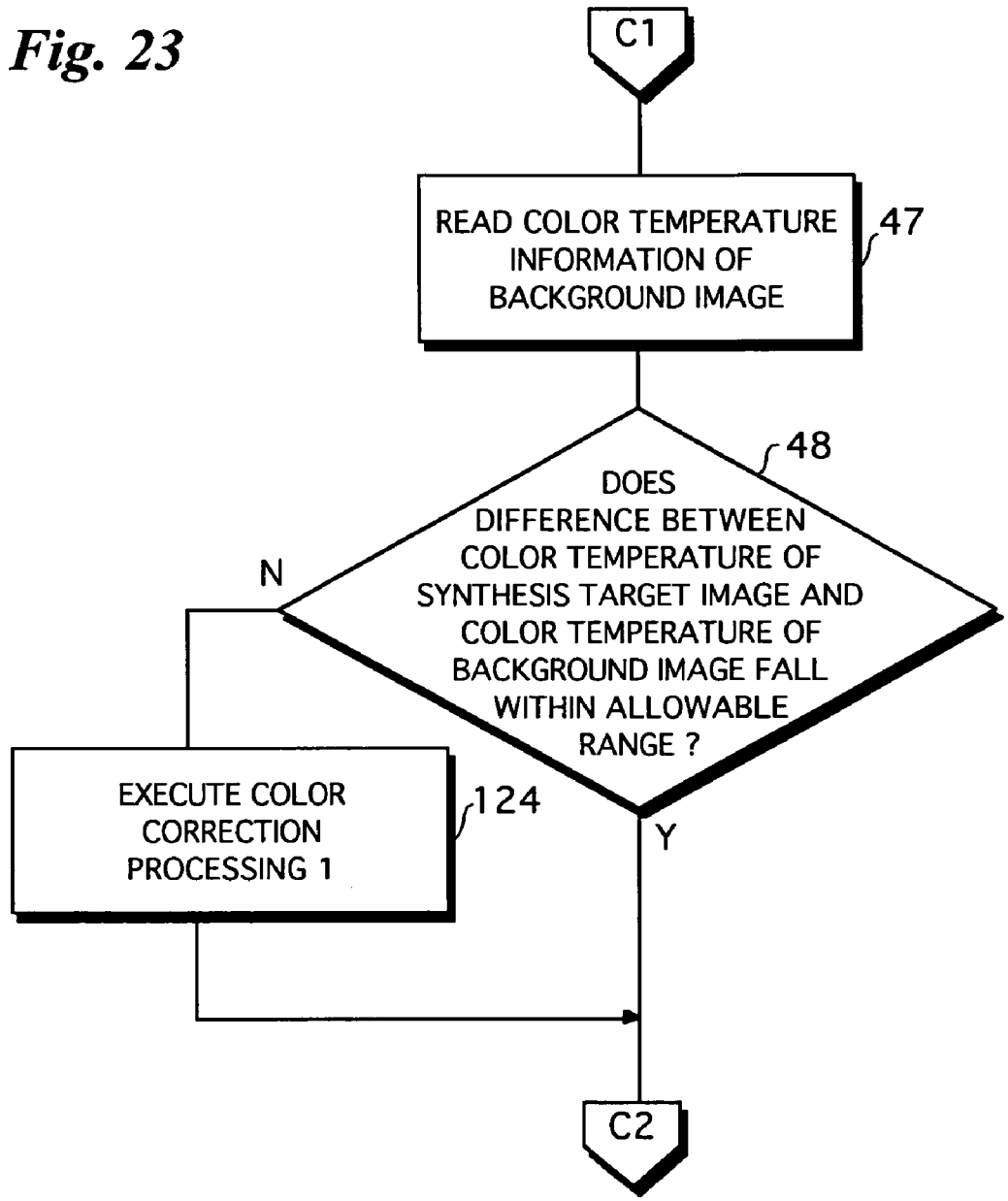
FIG. 23 is a flowchart illustrating the procedure of image synthesis processing.
Figure 24:
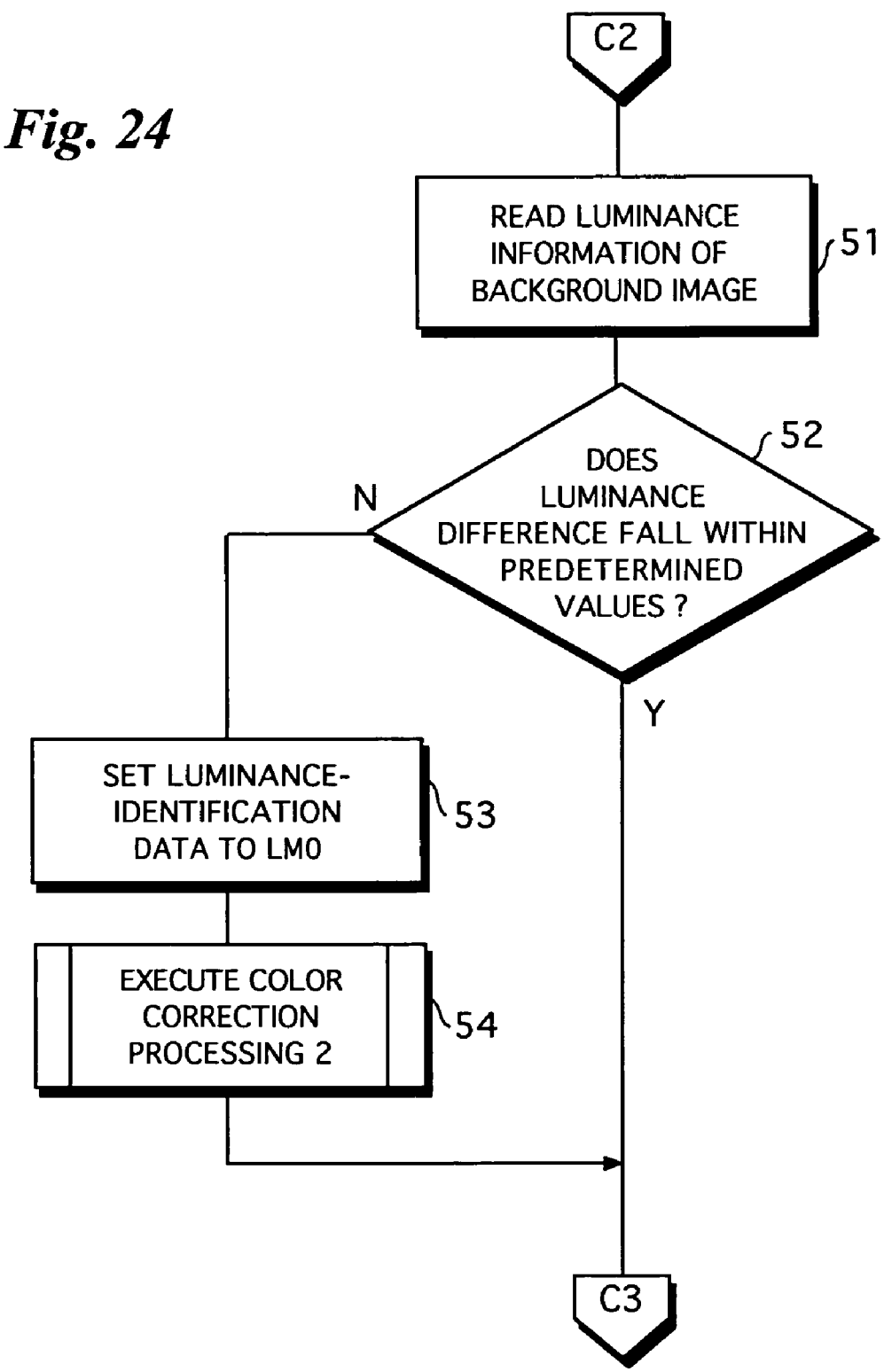
FIG. 24 is a flowchart illustrating the procedure of image synthesis processing.
Figure 25:
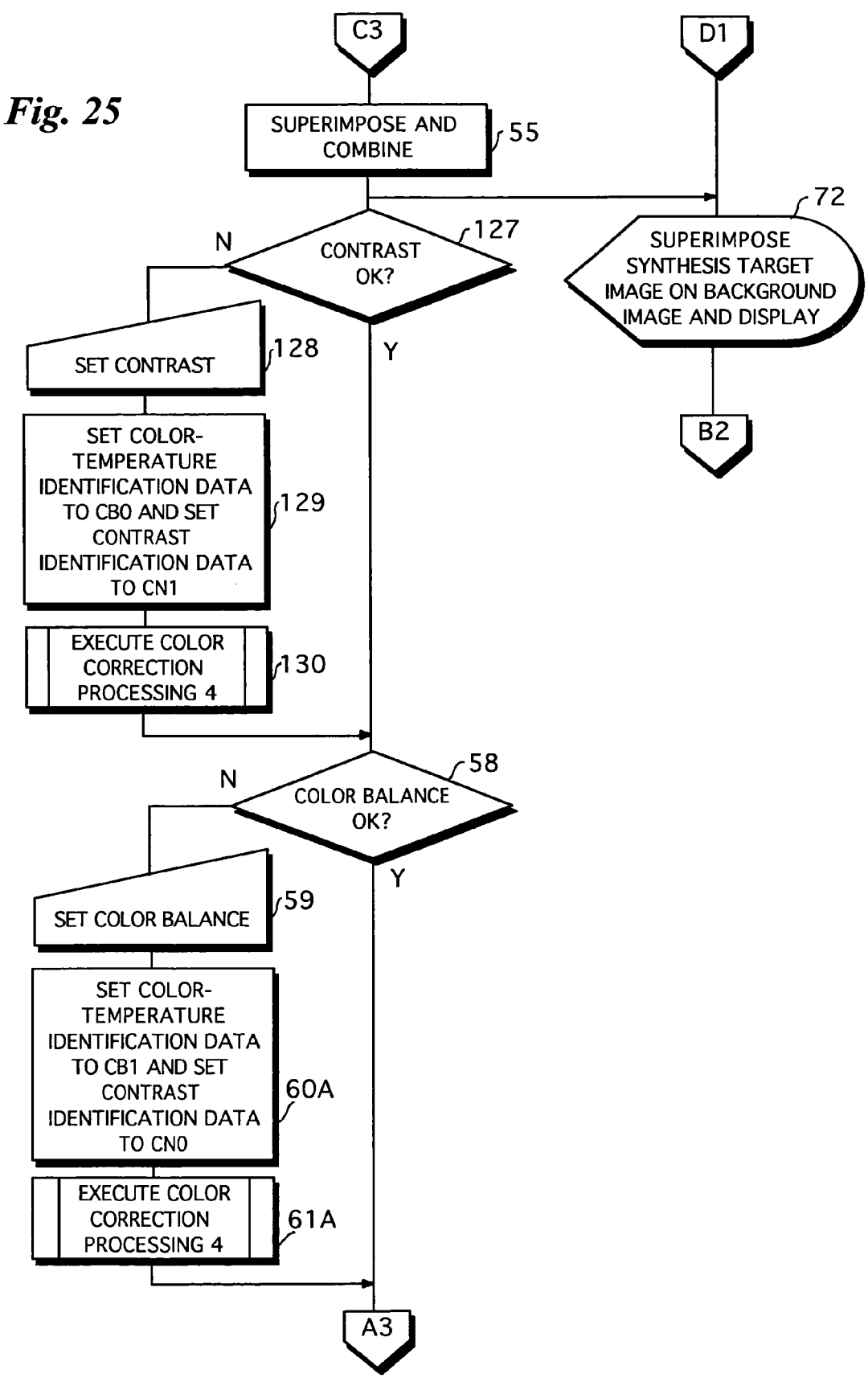
FIG. 25 is a flowchart illustrating the procedure of image synthesis processing.

FIGS. 20 and 21 are flowcharts illustrating the procedure of third color correction processing regarding the synthesis target image data.

First, the color temperature information of the synthesis target image is read out of the tag area of the synthesis target image memory 6 (step 160).

In third color correction processing, a matrix for converting the RGB image data to the tristimulus values XYZ is calculated in the manner described above (step 102). The RGB image data is converted to the tristimulus values XYZ using the calculated matrix. Furthermore, the tristimulus values obtained by the conversion are converted to image data in the L*a*b* calorimetric system (step 162). The tristimulus values XYZ and the L*a*b* calorimetric data obtained by the conversions are related as indicated by Equations 13 and 14. The image data of the L*a*b calorimetric system is obtained using Equations (13) and (14).

$$L^* = 116 \times g(Y/Y_n) - 16$$

$$a^* = 500 \times [g(X/X_n) - g(Y/Y_n)]$$

$$b^* = 200 \times [g(Y/Y_n) - g(Z/Z_n)] \qquad \text{Eq. 13}$$

$$g(P/P_n) = (P/P_n)^{1/3} P/P_n > 0.008856$$

$$g(P/P_n) = 7.787 \times P/P_n + 16/116 P/P_n 0.008856$$

$$P = X, Y, Z$$

$$P_n = X_n, Y_n, Z_n \qquad \text{Eq. 14}$$

It is determined whether the color-temperature identification data has been set to CB1 (step 172)

If the color-temperature identification data has been set to CB1 ("YES" at step 172), a color-balance correction value that has been set manually is read (step 175).

The color data a*, b* is extracted from the image data of the synthesis target image in the L*a*b* (step 164).

Color balance correction processing is applied to the color data a*b* in the L*a*b* calorimetric system of the synthesis target image using the manual color-balance correction value that has been read (step 176). More specifically, a correction quantity is read with reference to FIGS. 14A to 14C in conformity with the setting value set manually by the user. The read correction quantity Ka is added to the color data a*.

If the color balance correction is completed, the image data of the L*a*b* calorimetric system is converted to RGB image data (step 177).

If the color-balance identification data has not been set to CB1 ("NO" at step 172), a color balance correction is not carried out (the processing of steps 175 and 176 is skipped).

Second Embodiment

FIGS. 1 to 8 and FIGS. 13 to 19 in the first embodiment can be applied to the second embodiment as is.

In the first embodiment described above, synthesis target image data representing synthesis target images shot under a plurality of different photographic conditions is stored in the synthesis target image memory 6 and a single synthesis target image is selected from the plurality of synthesis target images. In the second embodiment, on the other hand, synthesis target image data representing a synthesis target image shot under a predetermined photographic condition is stored in the synthesis target image memory 6. The synthesis target image data representing this single synthesis target image is subjected to a color correction and combined with the background image.

FIGS. 22 to 25 are flowcharts illustrating the procedure of synthesis processing. Processes in these Figures identical with those shown in FIGS. 9 to 12 are designated by like reference characters and a description thereof is omitted.

It is determined whether information indicating whether a synthesis target image represented by synthesis target image data read from the synthesis target image memory 6 is frontlit or backlit matches information indicating whether a background image is frontlit or backlit and whether strobe information concerning the synthesis target image matches strobe information concerning the background image (step 45).

If all of these items of information match ("YES" at step 45), contrast identification data is set to CN0 (step 121). (The contrast identification data takes on a value CN0, CN1 or CN2. The data is set to CN0 as an initial value when the power supply is turned from off to on.) If at least one of these items of information does not match ("NO" at step 45), then the color-temperature identification data is set to CB0 and the contrast identification data is set to CN2 (step 122), whereupon fourth color correction processing is executed (step 123).

Further, it is determined whether the difference between the color temperature information of the synthesis target image and the color temperature information of the background image falls within an allowable range (step 48).

If the difference between these items of color temperature information does not fall within the allowable range ("NO" at step 48), then the above-described first color correction processing is executed (step 124). If the difference between these items of color temperature information does fall within the allowable range ("YES" at step 48), then the processing of step 124 is skipped.

Further, if the absolute value of the luminance difference between the average luminance of the synthesis target image and the average luminance of the background image does not fall within predetermined values ("NO" at step 52), then the luminance identification data is set to LM0 (step 53), as described earlier. Color correction processing is subsequently applied to the synthesis target image as set forth earlier (step 54).

A manual correction of contrast can be carried out as well. If the contrast of the synthesis target image (the luminance ratio of the darkest portion of the synthesis target image to the brightest portion thereof) differs (very greatly) from the contrast of the background image (the luminance ratio of the darkest portion of the background image to the brightest portion thereof) ("NO" at step 127), then a contrast correction value regarding the synthesis target image is set manually (step 128). The manual-setting liquid crystal display unit 25 displays a manual-contrast setting screen 180 shown in FIG. 26. (Naturally, an arrangement may be adopted in which the manual-contrast setting screen 180 is displayed in response to a command from the user.) The manual-contrast setting screen 180 includes an area 181 touched by the user to raise contrast, an area 182 touched by the user to lower contrast and a setting display area 183 in which a contrast setting value is displayed.

Figure 27:
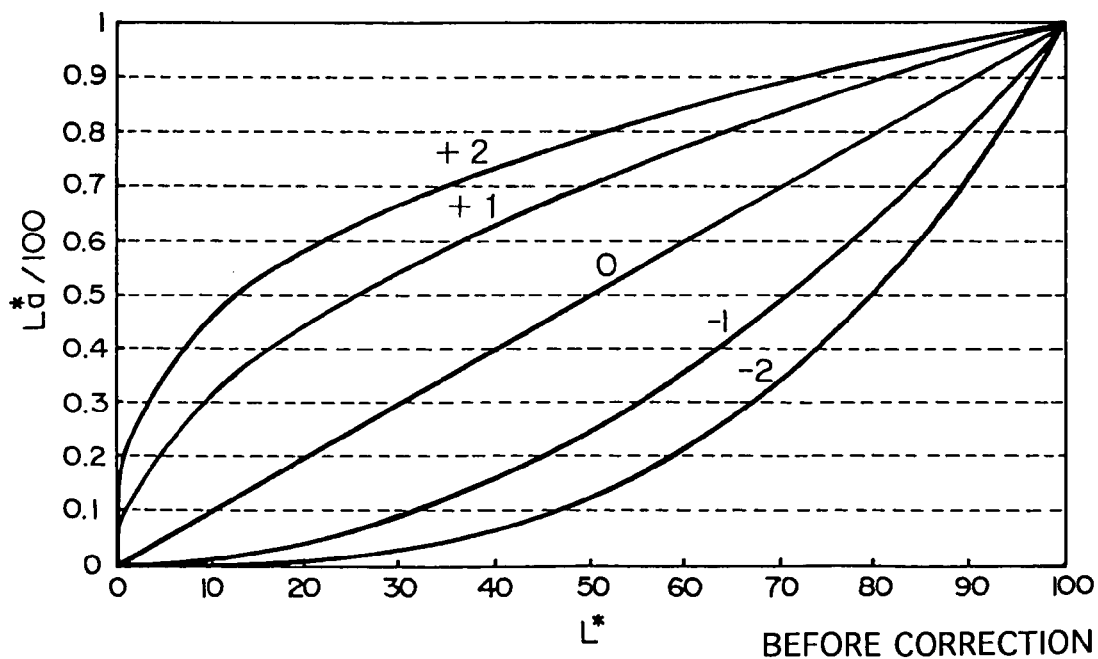
FIG. 27 illustrates an example of contrast correction curves.

FIG. 27 is a graph illustrating contrast correction curves.

Figure 26:
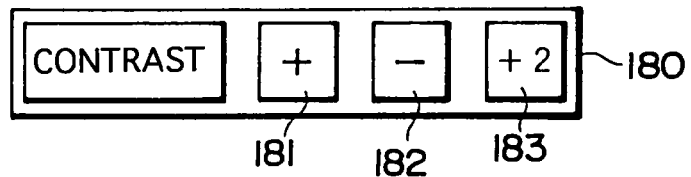
FIG. 26 illustrates an example of a screen for manual setting of contrast.

A correction curve conforming to the contrast setting value (the value being displayed in the setting display area 183 of the manual-contrast setting screen 180 of FIG. 26) is selected and the correction is carried out in accordance with the selected correction curve.

For example, if the set value of contrast in the manual-contrast setting screen 180 is "+2", the synthesis target image is subjected to the contrast correction using the +2 curve.

In a case where contrast correction value is set manually, the color-temperature identification data is set to CB0 and the contrast identification data is set to CN1 (step 129). Thereafter, fourth correction processing is applied to the synthesis target image (step 130).

When the color balance is set manually in the second embodiment ("NO" at step 58; step 59), the color-temperature identification data is set to CB1 and the contrast identification information is set to CN0 (step 60A). Fourth color-correction processing the same as that of step 130 is subsequently applied to the synthesis target image (step 61A).

Figure 28:
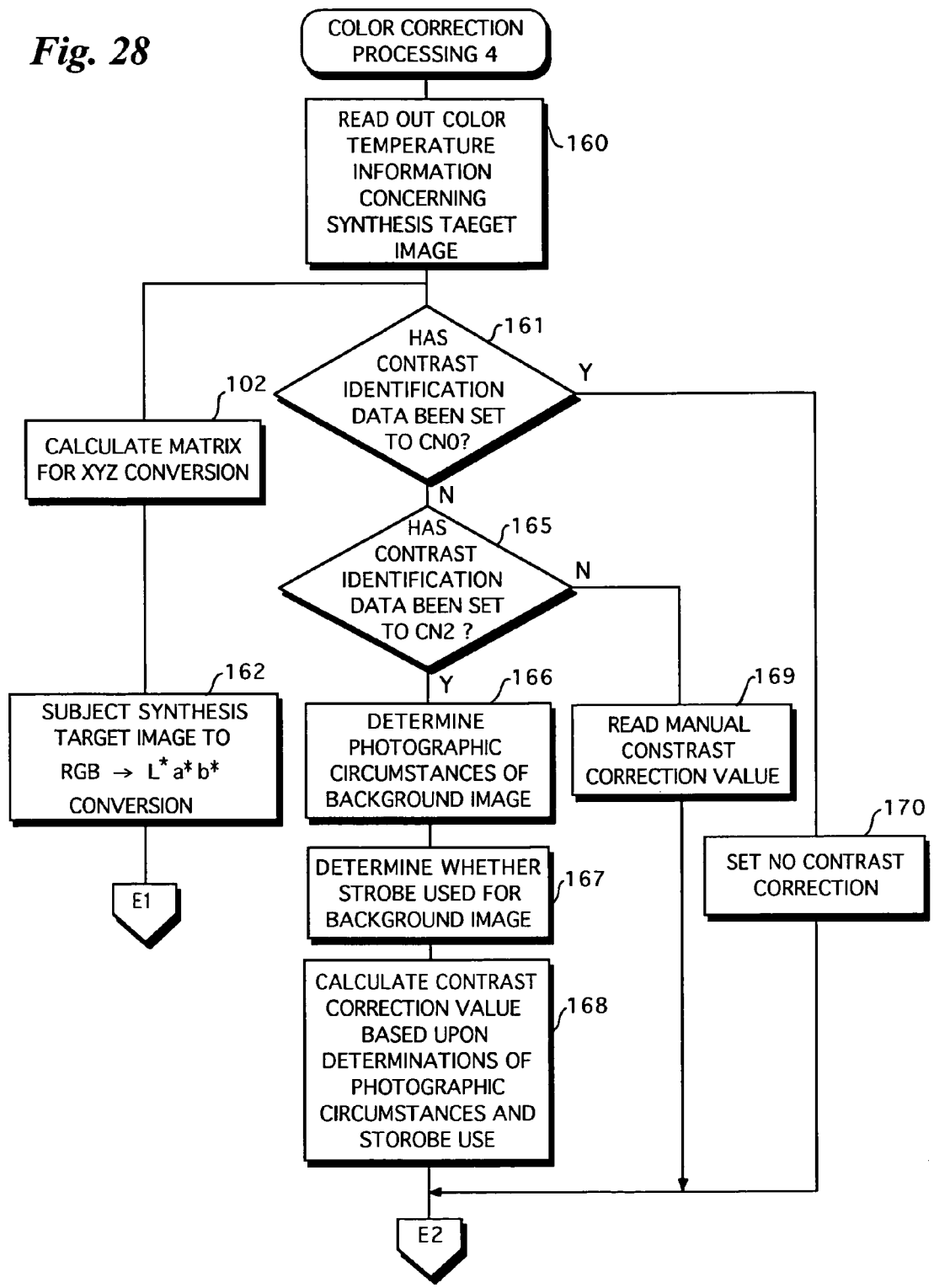
FIG. 28 is a flowchart illustrating the procedure of fourth color correction processing.
Figure 29:
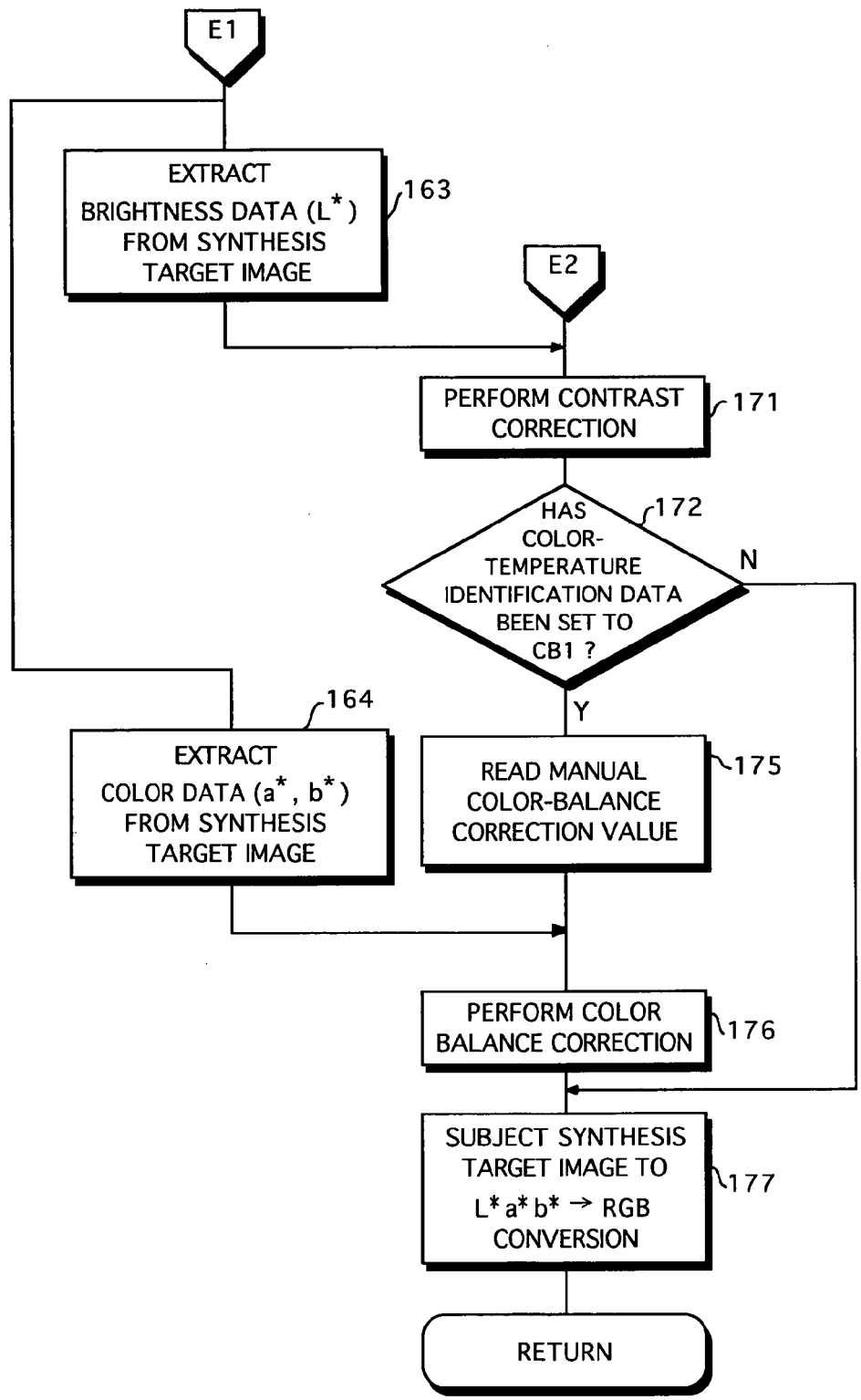
FIG. 29 is a flowchart illustrating the procedure of fourth color correction processing.

FIGS. 28 and 29 are flowcharts illustrating the procedure of fourth color correction processing. Fourth color correction processing corresponds to the third color correction processing and processing identical with that in the third color correction processing is designated by like reference characters and a description thereof is omitted.

It is determined whether contrast identification data is CN0 (step 160). If the contrast identification data has been set to CN0 ("YES" at step 161), the photographic circumstances as to whether the synthesis target image is frontlit or backlit and the strobe information of the synthesis target image match the photographic circumstances as to whether the background image is frontlit or backlit and the strobe information of the background image, respectively.

In this case, the luminance of the brightest portion of the synthesis target image and the luminance of the brightest portion of the background image are approximately equal. Further, the luminance of the darkest portion of the synthesis target image and the luminance of the darkest portion of the background image are approximately equal. Accordingly, the contrast of the synthesis target image representing the luminance ratio of the brightest portion to the darkest portion of the synthesis target image and the contrast of the background image representing the luminance ratio of the brightest portion to the darkest portion of the background image are substantially equal. A correction of contrast, therefore, is considered to be unnecessary and no contrast correction is set (step 170).

If the contrast identification data is not CN0 ("NO" at step 161), then it is determined whether the contrast identification data has been set to CN2 (step 165).

If the contrast identification data has not been set to CN2 ("NO" at step 165), ("NO" at step 165), then a manual contrast correction value is read in such a manner that the contrast correction will be carried out based upon a manual contrast correction value (step 169).

If the contrast identification data has been set to CN2 ("YES" at step 165), then the determinations concerning frontlighting/backlighting and use of strobe are performed with regard to the background image in order to carry out an automatic contrast correction (steps 166, 167). A contrast correction value is calculated based upon the determinations concerning frontlighting/backlighting and strobe (step 168). For example, if the synthesis target image is an image obtained by strobe photography and the background image is an image obtained in sunny weather, a contrast correction value is calculated so as to obtain a contrast correction curve (e.g., a "+1" correction curve) that will assign a contrast difference to the synthesis target image. If the synthesis target image is an image obtained in cloudy weather and the background image is an image obtained in sunny weather, a contrast correction value is calculated so as to obtain a contrast correction curve (e.g., a "+2" correction curve) that will assign a further contrast difference to the synthesis target image.

RGB data representing the synthesis target image is converted to image data in the L*a*b* calorimetric system in a manner similar to that of the first embodiment (steps 102, 162). Brightness data L* and color data a*, b* is calculated from image data in the L*a*b* calorimetric system (steps 163, 164).

If a contrast correction value is calculated or a manual contrast correction value is read, these values are used to perform a contrast correction with regard to the brightness data L* of the synthesis target image based upon the contrast correction curve (see FIG. 27) (step 171). It goes without saying that a color balance correction is carried out with regard to the color data a* and b* of the synthesis target image in a manner similar to that of the first embodiment (steps 172, 175, 176).

In the foregoing embodiments, a case in which a picture-taking and synthesis mode has been set is described. However, the image sensing apparatus according to these embodiments can be set to other modes, e.g., the picture-taking mode and synthesis mode, as well.

When the picture-taking mode has been set by the dial 21, a subject is photographed by the image sensing device 2 and is converted to digital image data in the analog/digital conversion circuit 3. The digital image data is subjected to a gamma correction in the signal processing circuit 4. The image data passes through the background image memory 5 and is applied to the digital/analog conversion circuit 13 via the image processing circuit 11 and the synthesis processing circuit 15. The image data is converted by the digital/analog conversion circuit 12 to an analog video signal, which is then applied to the image-display liquid crystal display unit 14. The image of the subject is displayed on the image-display liquid crystal display unit 14. The user decides the composition of the image while the image of the subject is being displayed on the image-display liquid crystal display unit 14. If the shutter-release button is pressed, the image data representing the image of the subject is stored in the background image memory 5 temporarily.

The image data is read out of the background image memory 5 and applied to the image processing circuit 11. The image processing circuit 11 subjects the image data to a color balance adjustment based upon color temperature information provided by the color temperature sensor 10. If necessary, moreover, the image processing circuit 11 executes brightness correction and other image processing. The image data merely passes through the synthesis processing circuit 15 and is applied to the memory card 30, where the data is recorded.

When the synthesis mode is set by the dial 21, a subject to serve as background will have been photographed in the picture-taking mode and the data representing the background image will have been stored in the background image memory 5. If the synthesis mode is set, the background image data is read out of the background image memory 5 and the background image is displayed on the image-display liquid crystal display unit 14. The synthesis target image data is read out of the synthesis target image memory 6 and is displayed on the image-display liquid crystal display unit 14 upon being superimposed on the background image. The size and position of the synthesis target image are adjusted as set forth earlier. If the size and position are decided and the execute button 24 is pressed, the synthesis target image is combined with the background image to obtain a composite image in the manner set forth above. The data representing the composite image is applied to the memory card 30 and is recorded thereon.

What is claimed is:

1. An image sensing apparatus, comprising:
    synthesis target information storage means for storing, in a storage device, data representing a synthesis target image of a foreground subject and for separately storing, also in the storage device, photographic conditions prevailing at a time of photography of the synthesis target image;
    image sensing means for photographing background and outputting data representing a background image;
    image adjustment processing means for applying image adjustment processing for at least one of a color adjustment and a luminance adjustment to the synthesis target image represented by the synthesis target image data, which has been stored in the storage device by the synthesis target information storage means, based upon the photographic conditions of the synthesis target image that have been stored in the storage device by the synthesis target information storage means and photographic conditions of the background image sensed by the image sensing means; and
    image synthesis means for combining the synthesis target image data that has been subjected to the image adjustment processing by the image adjustment processing means with the background image data output from the image sensing means, and outputting composite image data representing a composite image.

2. The image sensing apparatus according to claim 1, wherein the synthesis target image data that has been stored in the synthesis target image information storage means was obtained by strobe flash photography.

3. The image sensing apparatus according to claim 1, further comprising image adjustment command input means for inputting an image adjustment command for at least one of a color adjustment and a luminance adjustment, wherein the image adjustment processing means applies image adjustment processing for at least one of a color adjustment and a luminance adjustment to a synthesis target image based upon an image adjustment command input from the image adjustment command input means, and wherein the image synthesis means combines the synthesis target image data, which has been subjected to image adjustment processing by the image adjustment means, with the background image data.

4. The image sensing apparatus according to claim 1, further comprising:

a display unit for displaying images;

background image display control means for controlling the display unit so as to display the background image sensed by the image sensing means; and composite image display control means for controlling the display unit so as to display the composite image synthesized by the image synthesis means.

5. The image sensing apparatus according to claim 4, further comprising:

adjustment command input means for inputting an adjustment command for at least one of position and size adjustment of a synthesis target image being displayed on the display unit; and adjustment means for applying an adjustment for at least one of position and size adjustment of the synthesis target image based upon the adjustment command input from the adjustment command input means.

6. An image sensing method, comprising: storing, in a storage device, data representing a synthesis target image of a foreground subject obtained by photography;

separately storing, in the storage device, photographic conditions prevailing at a time of photography of the synthesis target image;

obtaining data representing a background image by photographing a background;

applying image adjustment processing for at least one of a color adjustment and a luminance adjustment to the synthesis target image represented by the synthesis target image data stored in the storage device based upon the photographic conditions of the synthesis target image stored in the storage device and photographic conditions prevailing at the time of photography of the background; and combining the synthesis target image data that has been subjected to the image adjustment processing and the background image data, and outputting composite image data representing a composite image.

7. The image sensing apparatus according to claim 1, wherein the image adjustment processing means performs the color adjustment prior to performing the luminance adjustment of the synthesis target image.

8. The image sensing apparatus according to claim 1, wherein the photographic conditions include photographic circumstances and strobe information.

9. The image sensing apparatus according to claim 1, wherein the photographic conditions of the synthesis target image prevailing at the time of photography of the synthesis target image are predetermined.

10. The image sensing method according to claim 6, wherein the photographic conditions of the synthesis target image prevailing at the time of photography of the synthesis target image are predetermined.

11. The image sensing method according to claim 6, further comprising: obtaining the synthesis target image data through strobe flash photography.

12. The image sensing method of claim 6, further comprising:

receiving an image adjustment command from a user for adjusting at least one of a color adjustment and luminance adjustment; and applying image adjustment processing for the at least one of a color adjustment and a luminance adjustment to a synthesis target image represented by the selected synthesis target image data based upon the received image adjustment command.

13. The image sensing method of claim 6, further comprising:

displaying images on a display unit;

controlling said display unit so as to display the background image; and controlling said display unit so as to display the composite image.

14. The image sensing method of claim 13, further comprising:

receiving an adjustment command for adjusting at least one of a position and a size of a synthesis target image being displayed on the display unit; and applying an adjustment for at least one of position and size adjustment of the synthesis target image based upon the received adjustment command.

15. An image sensing method, comprising: storing, in a synthesis target image memory, synthesis target image data of a foreground subject obtained by photography under a predetermined lighting condition;

obtaining background image data through photographing a background and storing the background image data to a background image memory;

obtaining background lighting condition corresponding to the background image data at the time the background is photographed;

automatically determining, without user input, whether a first image adjustment processing on the synthesis target image data is necessary based on the predetermined lighting condition and the background lighting condition;

performing the first image adjustment processing on the synthesis target image data when it is automatically determined that the image adjustment processing on the synthesis target image data is necessary;

combining the synthesis target image data that have been processed through the first image adjustment processing and the background image data to generate composite image data representing a composite image;

allowing a user to determine whether a second image adjustment processing is necessary based on the composite image;

performing the second image adjustment processing on the synthesis target image data when the user determines that the image adjustment processing on the synthesis target image data is necessary; and combining the synthesis target image data that have been processed through the second image adjustment processing and the background image data to generate composite image data representing a composite image.

16. The image sensing method according to claim 15, further comprising:

separately storing, in the synthesis target image memory, the predetermined lighting condition or separately storing, in the background image memory, the background lighting condition, wherein the step of automatically determining, without user input, whether the first image adjustment processing on the synthesis target image data is necessary includes:
comparing the predetermined lighting condition stored in the synthesis target image memory with the background lighting condition stored in the background image memory.

17. The image sensing method according to claim 16, wherein the predetermined lighting condition and the background lighting condition include any one or more of a strobe photography, frontlit photography, cloudy-weather photography, backlit photography, color temperature, brightness, contrast, and luminance.

18. The image sensing method according to claim 15, wherein the first image adjustment processing on the synthesis target image data includes any one or more of a contrast correction processing, a color correction processing, and a luminance correction processing, and
wherein the second image adjustment processing on the synthesis target image data also includes any one or more of the contrast correction processing, the color correction processing, and the luminance correction processing.

19. The image sensing method according to claim 18, wherein the contrast correction processing includes the steps of:
determining if contrast correction values have been set manually;
performing contrast correction on the synthesis target image data based on the manually set contrast correction values when it is determined that the contrast correction values have been set manually;
calculating the contrast correction values based on the predetermined lighting condition and the background lighting condition when it is determined that the contrast correction values have not been set manually; and
performing the contrast correction on the synthesis target image data based on the calculated contrast correction values when it is determined that the contrast correction values have not been set manually.

20. The image sensing method according to claim 19, wherein the step of calculating the contrast correction values includes calculating the contrast correction values based on a difference in brightness between the predetermined lighting condition and the background lighting condition.

21. The image sensing method according to claim 18, wherein the color correction processing includes the steps of:
converting RGB color values of the synthesis target image data to corresponding XYZ tristimulus values;
calculating correction coefficients based on color temperature data in the predetermined lighting condition and on color temperature data in the background lighting condition;
performing color balance correction on the XYZ tristimulus values; and converting the corrected XYZ tristimulus values to corrected RGB color values.

22. The image sensing method according to claim 18, wherein the luminance correction processing includes the steps of:
determining if luminance correction values have been set manually;
performing luminance correction on the synthesis target image data based on the manually set luminance correction values when it is determined that the luminance correction values have been set manually;
calculating the luminance correction values based on the predetermined lighting condition and the background lighting condition when it is determined that the luminance correction values have not been set manually; and
performing the luminance correction on the synthesis target image data based on the calculated luminance correction values when it is determined that the luminance correction values have not been set manually.

23. The image sensing method according to claim 22, wherein the step of calculating the luminance correction values includes:
calculating the luminance correction values based on
a difference in brightness between the predetermined lighting condition and the background lighting condition, or
whether the background image was frontlit or backlit, or both.

24. The image sensing method according to claim 18, wherein the step of automatically determining whether the first image adjustment processing on the synthesis target image data is necessary includes:
determining whether the contrast correction processing is necessary;
performing the contrast correction processing when it is determined that the contrast correction processing is necessary;
determining whether the color correction processing is necessary;
performing the color correction processing when it is determined that the color correction processing is necessary;
determining whether the luminance correction processing is necessary; and
performing the luminance correction processing when it is determined that the luminance correction processing is necessary.

25. The image sensing method according to claim 24, wherein the step of determining whether the contrast correction processing is necessary includes:
determining a first condition of whether a frontlit or backlit information of the predetermined lighting condition matches a frontlit or backlit information of the background lighting condition;
determining a second condition of whether a strobe information of the predetermined lighting condition matches a strobe information of the background lighting condition;
determining that the contrast correction processing is necessary when it is determined that one or both of the first and second conditions are not true; and
determining that the contrast correction processing is not necessary when it is determined that both of the first and second conditions are true.

26. The image sensing method according to claim 24, wherein the step of determining whether the color correction processing is necessary includes:
determining whether a difference between a color temperature of the predetermined lighting condition and a color temperature of the background lighting condition is within a predetermined allowable color difference range;
determining that the color correction processing is necessary when it is determined that the difference between the color temperature of the predetermined lighting condition and the color temperature of the background lighting condition is not within the predetermined allowable color difference range; and determining that the color correction processing is not necessary when it is determined that the difference between the color temperature of the predetermined lighting condition and the color temperature of the background lighting condition is within the predetermined allowable color difference range.

27. The image sensing method according to claim 24, wherein the step of determining whether the luminance correction processing is necessary includes:

determining whether a difference between a luminance of the predetermined lighting condition and a luminance of the background lighting condition is within a predetermined allowable luminance difference range;

determining that the luminance correction processing is necessary when it is determined that the difference between the luminance of the predetermined lighting condition and the luminance of the background lighting condition is not within the predetermined allowable luminance difference range; and determining that the luminance correction processing is not necessary when it is determined that the difference between the luminance of the predetermined lighting condition and the luminance of the background lighting condition is within the predetermined allowable luminance difference range.

28. The image sensing method according to claim 18, wherein the step of allowing the user to determine whether the second image adjustment processing on the synthesis target image data is necessary includes:

allowing the user the manual set contrast correction values;

performing the contrast correction processing when the contrast correction values are manually set;

allowing the user the manual set color balance values;

performing the color correction processing when the color balance values are manually set;

allowing the user the manual set luminance correction values;

performing the luminance correction processing when the luminance correction values are manually set.

* * * * *